(12) United States Patent
Shibata et al.

(10) Patent No.: US 8,111,605 B2
(45) Date of Patent: Feb. 7, 2012

(54) APPARATUS AND METHOD FOR FORMING IMAGE DATA ON AN OPTICAL DISK

(75) Inventors: Michihiro Shibata, Odawara (JP); Hiroshi Kubo, Minato-ku (JP); Tatsuo Fushiki, Hamamatsu (JP); Seiya Yamada, Shimada (JP); Hisanori Itoga, Hamamatsu (JP)

(73) Assignees: FUJIFILM Corporation, Tokyo (JP); Yamaha Corporation, Shizuoka (JP)

( * ) Notice: Subject to any disclaimer, the term of this patent is extended or adjusted under 35 U.S.C. 154(b) by 605 days.

(21) Appl. No.: 11/990,853

(22) PCT Filed: Sep. 28, 2006

(86) PCT No.: PCT/JP2006/319916
§ 371 (c)(1),
(2), (4) Date: Feb. 22, 2008

(87) PCT Pub. No.: WO2007/037515
PCT Pub. Date: Apr. 5, 2007

(65) Prior Publication Data
US 2009/0135708 A1    May 28, 2009

(30) Foreign Application Priority Data

Sep. 30, 2005 (JP) .............................. 2005-287883

(51) Int. Cl.
*G11B 7/24* (2006.01)
(52) U.S. Cl. .................................................. 369/275.4
(58) Field of Classification Search ................ 369/275.4, 369/274, 275.1, 275.3, 275.2, 116; 347/224, 347/225
See application file for complete search history.

(56) References Cited

U.S. PATENT DOCUMENTS

| 6,192,021 | B1 | 2/2001 | Saito et al. |
| 7,082,094 | B2 * | 7/2006 | Morishima et al. ............ 369/116 |
| 7,268,794 | B2 * | 9/2007 | Honda et al. ................... 347/224 |
| 7,558,169 | B2 * | 7/2009 | Morishima ................. 369/44.35 |
| 7,643,401 | B2 * | 1/2010 | Takahashi et al. ......... 369/275.4 |
| 2001/0026531 | A1 | 10/2001 | Onodera et al. |

(Continued)

FOREIGN PATENT DOCUMENTS

CN    101300631 A    11/2008

(Continued)

OTHER PUBLICATIONS

Corresponding European Search Report dated Jun. 4, 2009.

(Continued)

*Primary Examiner* — Tan X Dinh
(74) *Attorney, Agent, or Firm* — Sheldon J. Moss; Chad M. Herring

(57) ABSTRACT

The invention provides an optical disk system having at least: an optical disk including, on a substrate having pre-pits, an image-recording layer capable of drawing an image by irradiating a laser light; and a reading device which reads information included in the pre-pits by a return light of the laser light when the laser light having a wavelength of in a range of 630 to 680 nm is irradiated to the pre-pit of the optical disk. The pre-pits have a shortest pit length in a range from 0.6 to 0.9 μm being formed on the substrate. The invention further provides an optical disk recording apparatus, an image drawing method and an optical disk which utilize the optical disk system.

6 Claims, 14 Drawing Sheets

IN CASE WHEN BEAM SPOT DIAMETER IS LARGE

IN CASE WHEN BEAM SPOT DIAMETER IS SMALL

U.S. PATENT DOCUMENTS

| | | | |
|---|---|---|---|
| 2003/0179674 A1 | 9/2003 | Anderson et al. | |
| 2004/0100895 A1* | 5/2004 | Suenaga et al. | 369/275.4 |
| 2004/0240326 A1* | 12/2004 | Aoyama et al. | 369/275.4 |
| 2005/0180304 A1* | 8/2005 | Onodera et al. | 369/275.3 |
| 2005/0265211 A1* | 12/2005 | Nakane et al. | 369/275.1 |
| 2007/0002721 A1* | 1/2007 | Yoshimura et al. | 369/286 |
| 2007/0019064 A1* | 1/2007 | Yamada et al. | 347/224 |
| 2008/0153037 A1* | 6/2008 | Shibata | 430/290 |
| 2009/0290459 A1* | 11/2009 | Yamada et al. | 369/47.5 |

FOREIGN PATENT DOCUMENTS

| | | |
|---|---|---|
| EP | 1274084 A | 1/2003 |
| EP | 1308938 A | 5/2003 |
| EP | 1930893 A | 6/2008 |
| JP | 11-86319 A | 3/1999 |
| JP | 2000-173096 A | 6/2000 |
| JP | 2004-030800 A | 1/2004 |
| JP | 2000-113516 A | 4/2004 |
| JP | 2004-213796 A | 7/2004 |
| JP | 2005-182980 A | 7/2005 |
| WO | 2005/031727 A | 4/2005 |
| WO | 2007/026813 A | 3/2007 |

OTHER PUBLICATIONS

Corresponding Chinese Office Action dated Feb. 5, 2010.

* cited by examiner

DISK CENTER

IN CASE WHEN GRADATION AT A SET OF COORDINATES IS RELATIVELY LARGE

IN CASE WHEN GRADATION AT A SET OF COORDINATES IS RELATIVELY SMALL

INSERTION OF SSP1

INSERTION OF SSP2

IN CASE WHEN BEAM SPOT DIAMETER IS LARGE

IN CASE WHEN BEAM SPOT DIAMETER IS SMALL

APPARATUS AND METHOD FOR FORMING IMAGE DATA ON AN OPTICAL DISK

BACKGROUND OF THE INVENTION

1. Field of Invention

The invention relates to an optical disk system that records an image on an optical disk on which images can be drawn by irradiation of laser light, an optical disk recording apparatus, an image drawing method and an optical disk.

2. Description of Related Art

Optical recording media (optical disks) where information is recorded only once by laser beam irradiation are known. Such optical disks, often called recordable CD's (so-called CD-R), have a typical structure wherein a information recording layer containing an organic dye, a light-reflectance layer of a metal such as gold, and a resin protective layer are formed on a transparent disk-shaped substrate in that order. Information is recorded on a CD-R by irradiation of a laser beam in the near-infrared region onto the CD-R (normally, laser beam at a wavelength of around 780 nm). In the irradiated area of the information recording layer light is absorbed, there is a resulting localized increase in temperature, and this changes its physical and chemical properties (e.g., pit generation). Because of these physical and chemical changes the optical properties are changed and information can be recorded. Reading of the information (reproduction) is also carried out by irradiating with a laser beam having a wavelength the same as that of the recording laser beam. Information is reproduced by detecting the difference in reflectance between areas where the optical properties of the information recording layer have been changed (recorded area) and areas where they are not changed (unrecorded area).

Recently, there is an increasing need for optical recording media higher in recording density. To satisfy this need, an optical disk called a Digital Versatile Disc (so-called DVD-R) has been proposed. The DVD-R has a structure wherein two discs, each consisting of a information recording layer containing a dye, normally a light-reflectance layer over each information recording layer, and also a protective layer as needed, are formed on transparent disk-shaped substrates. On the disk-shaped substrates there are guiding grooves (pre-grooves) for tracking an irradiation laser beam, formed of a width of half or less (0.74 to 0.8 µm) of those of a CD-R. These two disks are laminated together, with an adhesive, on the information recording layer side. Alternatively two disks of the above construction can be laminated together with a disc shaped protective layer laminated between them on the information recording layer side. Recording and reproduction of information on and from the DVD-R are carried out by irradiation of a visible laser beam (normally, a laser beam having a wavelength in the range of 630 to 680 nm), and the recording density of a DVD-R can be made higher than that of a CD-R.

There are some known optical disks whereon a label is adhered onto the surface opposite to the recording surface. Such a label carries printed visible image information such as the song title of the audio data recorded on the recording surface, and other titles for identifying the recorded data, and the like. Such optical disks are prepared by printing the titles and the like on a circular label sheet by using, for example, a printer, and then affixing the label on the surface opposite to the recording surface of the optical disk.

However, as described above, preparation of an optical disk carrying a label, on which desired visible images such as title are recorded demands a printer in addition to an optical disk drive. Accordingly, it requires the cumbersome procedure of recording information on the recording surface of an optical disk in an optical disk drive, then removing the optical disk from the optical disk drive, and affixing a label printed by a separate printer.

In view of this, an optical disk recording apparatus capable of drawing an image on the label surface as well as recording and reproducing the information by using laser light has been proposed (as disclosed in Japanese Patent Application Laid-open (JP-A) No. 2003-203348). This optical disk recording apparatus is made for an optical disk having a thermosensitive layer on the label surface, and makes a visible image by scanning a laser pickup and imagewisely irradiating laser light onto the thermosensitive layer (or an image recording layer) to change the color of the irradiated portions.

Further, various kinds of optical disks capable of representing visible information using a contrast caused by difference of reflection between a laser-light-irradiated part and a non-laser-light-irradiated-part on a surface opposite to the information recording layer for recording digital information have been proposed (for example, as disclosed in a JP-A Nos. 2000-113516, 2001-283464, and 2000-173096).

Images with higher quality may be formed by making the image-recording side of the optical disk recognizable by a disk drive by forming pre-pits at the image-recording side of the optical disk having an image-recording layer, or by recording the optimum drawing conditions for each disk on pre-pits, in order to draw images based on the conditions, by reading them when the image is drawn.

In view of saving hardware resources, it is advantageous to use the same laser light as the laser light used for recording and playback of the information recording layer for reading the pre-pits when the pre-pits are formed at the image recording side. Specifically, when the information recording layer is of DVD standard, for example, information is recorded and reproduced with such a laser light having the above-mentioned wavelength (from 630 to 670 nm), and it is preferable that information is read by irradiating the same laser light to the pre-pits at the image-recording layer side.

On the other hand, it is not necessary to make the standard the same for the information-recording layer side and the image-recording side with respect to the density of the pre-pits and the modulation method. For example, the information-recording layer could be of the DVD standard while the pre-pits at the image-recording layer side could be of the CD standard. Since CD and related technologies thereof have preceded DVD, they are almost mature technologies which have been used for a long period of time with abundant technical resources such as know-how. Accordingly, it may even be preferable that the image-recording layer is of the CD standard even when the information-recording layer side is of the DVD standard. In addition, the CD standard is able to prevent maloperation of erroneously reading an image with an optical disk recording apparatus that is not compatible with image recording, when the image-recording layer is of the CD standard.

SUMMARY OF THE INVENTION

The invention provides an optical disk system that is able to discriminate an image-recording surface of an optical disk on which an image-recording layer capable of having images drawn thereon by irradiation of a laser light is formed, and is able to draw a high quality image. The invention also provides an optical disk recording apparatus, an image drawing method and an optical disk applicable to the optical recording system.

Namely, the invention provides an optical disk system comprising: an optical disk comprising, on a substrate having pre-pits, an image-recording layer capable of drawing an image by irradiating a laser light; and a reading device which reads information included in the pre-pits by a return light of the laser light when the laser light having a wavelength of in a range of 630 to 680 nm is irradiated to the pre-pit of the optical disk, wherein the pre-pits have a shortest pit length in a range from 0.6 to 0.9 μm being formed on the substrate.

The invention further provides an optical disk recording apparatus comprising: a reading device which irradiates a laser light having a wavelength of in a range of 630 to 680 nm to an optical disk comprising, on a substrate having pre-pits, an image-recording layer capable of drawing an image by irradiating a laser light; and a reading device which reads information included in the pre-pits by a return light of the laser light when the laser light having a wavelength of in a range of 630 to 680 nm is irradiated to the pre-pit of the optical disk, wherein the pre-pits have a shortest pit length in a range from 0.6 to 0.9 μm being formed on the substrate.

The invention further provides a method for image-drawing on an optical disk comprising: irradiating a laser light having a wavelength of in a range of 630 to 680 nm to an optical disk comprising, on a substrate having pre-pits, an image-recording layer capable of drawing an image by irradiating a laser light; reading information included in the pre-pits by a return light of the laser light when the laser light having a wavelength of in a range of 630 to 680 nm is irradiated to the pre-pit of the optical disk; and drawing the image in accordance with the information included in the pre-pits, wherein the pre-pits have a shortest pit length in a range from 0.6 to 0.9 μm being formed on the substrate.

Furthermore, the invention further provides a optical disk comprising: a substrate having pre-pits; and an image-recording layer that is formed on the substrate and is capable of drawing an image by irradiating a laser light, wherein the pre-pits have a shortest pit length in a range from 0.6 to 0.9 μm being formed on the substrate, and drawing of the image is conducted by irradiating the laser light having a wavelength of 630 to 680 nm to the pre-pit so as to read information included in the pre-pits by a return light of the laser light.

DETAILED DESCRIPTION OF THE INVENTION

Figure 1:
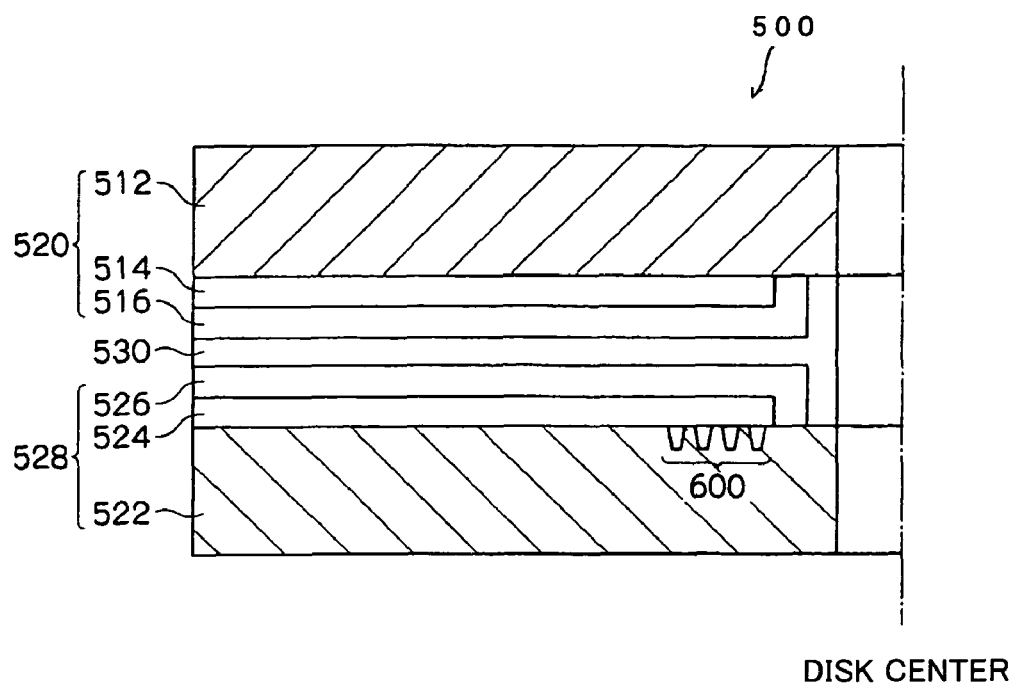
FIG. 1 is a partial cross-sectional view illustrating a layer structure of an optical disk according to the present invention.

The optical disk system of the invention includes an optical disk including, on a substrate having pre-pits, an image-recording layer capable of having an image drawn thereon by irradiating a laser light; and a reading device which reads information included in the pre-pits by return light of the laser light when laser light having a wavelength of in a range of 630 to 680 nm is irradiated to the pre-pits of the optical disk, wherein the pre-pits being formed on the substrate have a shortest pit length in a range from 0.6 to 0.9 μm.

In the description of embodiments of the invention below, the optical disk system, optical disk recording apparatus and image-drawing method will be described first.

The optical disk of the invention comprises a substrate having pre-pits with a shortest pit length in a range of 0.6 to 0.9 μm, and an image-recording layer formed on the substrate and being capable of having a visible image draw thereon by irradiating a laser light. Information included in the pre-pits is read by a return light of the laser light when the laser light with a wavelength in a range of 630 to 680 nm is irradiated to the pre-pits, and the image is drawn on the image-recording layer. Pre-pits with a shortest pit length in a range of 0.6 to 0.9 μm are formed on the surface of the image-recording layer side of the substrate. The pre-pits carry information related to drawing the image of the image-recording layer, such as image-drawing laser power and light emission patterns, in order to enable signal detection of information on image drawing to be facilitated. Different image drawing conditions for respective disks may be recorded as pre-pit information in advance using information on drawing, and high image drawing characteristics may be manifested by drawing the image under optimum drawing condition based on pre-pit information. Information on manufacturers can be also loaded on the pre-pit.

The structure of the optical disk of the invention is not particularly restricted, so long as pre-pits as above are formed and the optical disk has an image-recording layer. In other words, the optical disk may be any of read only, write-once-read-many and rewritable types of the optical disk. The write-once-read-many type of optical disk is preferable among them. The recording form is not particularly restricted, and examples thereof include phase-transition, photomagnetic and dye-containing. An optical disk of the dye-containing type is preferable.

The optical disk of the invention may be applied to DVDs (DVD in addition to DVD-R, DVD-RW, DVD+R and DVD+RW and the like). That is a bonded together type of optical disk, wherein an information-recording layer is formed on the surface of at least one substrate, while there is an image-recording layer on the surface of another substrate on which pre-pits are formed, and these substrates are bonded together.

Examples of the structure of the layers of the optical disk are as follows:

(1) a first layer structure comprising a first substrate having an information-recording layer, a reflection layer and an adhesive layer sequentially formed on the first substrate, and a second substrate having an image-recording layer and bonded together to the adhesive layer of the first substrate;

(2) a second layer structure comprising a first substrate having an information-recording layer, a reflection layer, a protective layer and an adhesive layer sequentially formed on the first substrate, and a second substrate having an image-recording layer and bonded together to the adhesive layer of the first substrate;

(3) a third layer structure comprising a first substrate having an information-recording layer, a reflection layer, a protective layer, an adhesive layer and a protective layer sequentially formed on the first substrate, and a second substrate having an image-recording layer and bonded together to the protective layer of the first substrate;

(4) a fourth layer structure comprising a first substrate having an information-recording layer, a reflection layer, a protective layer, an adhesive layer, a protective layer and a reflection layer sequentially formed on the first substrate, and a second substrate having an image-recording layer and bonded together to the reflection layer of the first substrate;

(5) a fifth layer structure comprising a first substrate having an information-recording layer, a reflection layer, an adhesive layer and a reflection layer sequentially formed on the first substrate, and a second substrate having an image-recording layer and bonded together to the reflection layer of the first substrate; and (6) a sixth layer structure comprising an information recording layer, a reflection layer and a protective layer sequentially formed on the first substrate, and a second substrate having an image-recording layer, a reflection layer and a protective layer sequentially formed on the second substrate, wherein protective layers of both substrates are bonded to one another with interposition of an adhesive layer.

The layer structures in above-mentioned (1) to (6) are merely examples, and the above-mentioned sequences are only examples and some of the layers may be replaced. Or, some of the layers (except the information-recording layer and image-recording layer) may be omitted. Each layer may comprise one layer, or a plurality of layers.

The substrates and each layer will be described below. The first substrate and the second substrate are collectively named as "substrate" in some cases in the following description.

FIG. 1 is a partial cross-sectional view illustrating the layer structure of an optical disk according to the invention 500. The optical disk 500 has a first lamination body 520 having an information-recording layer 514 and first reflection layer 516 on a first substrate 512 in that order, and a second lamination body 528 having an image-recording layer 524, where a visible image is recorded by irradiation of a laser beam, and a second reflection layer 526 on the second substrate 522 in that order; and the first lamination body 520 and the second lamination body 528 are laminated to each other via an adhesive layer 530, with the first reflection layer 516 and the second reflection layer 526 facing each other. Pre-pits 600 are formed on the surface on which the image-recording layer of the second substrate 522 is formed. The image-recording layer 524 is formed so as to cover a region in which the pre-pit 600 is formed as shown in FIG. 1. This means that the image-recording layer 524 is formed on the region of the pre-pit 600. However, the image-recording layer may be formed so as to be outside of the pre-pit 600 region.

While the pre-pit is formed at the internal circumference side in FIG. 1, it may be formed at the external circumference side.

The optical disk of the invention comprises the pre-pits formed on the substrate at the image-recording layer side, the pre-pits are of the so-called CD standard having a shortest pit length in a range of 0.6 to 0.9 μm. The pre-pits of the optical disk of the invention is read with a laser light (pick-up light) having a wavelength in a range of 600 to 680 nm. Accordingly, since the pre-pit of the CD standard is read by laser light having the above-mentioned wavelength, information included in the pre-pit at the information-recording layer side is preferably recorded by EFM modulation as employed in the CD standard.

The track pitch of the pre-pit is preferably in a range of 1.5 to 1.7 μm from the view point of reading by the CD standard. Likewise, the laser light irradiated onto the pre-pit is preferably converged with a lens having a numerical aperture in a range of 0.6 to 0.7.

The modulation factor of the pre-pit is preferably 0.5 or more, more preferably 0.6 or more, from the view point of stability of reading signals. The modulation factor used in the invention is defined as a value of the difference between the maximum reflectivity and minimum reflectivity of the signal, divided by the maximum reflectivity.

Figure 2:
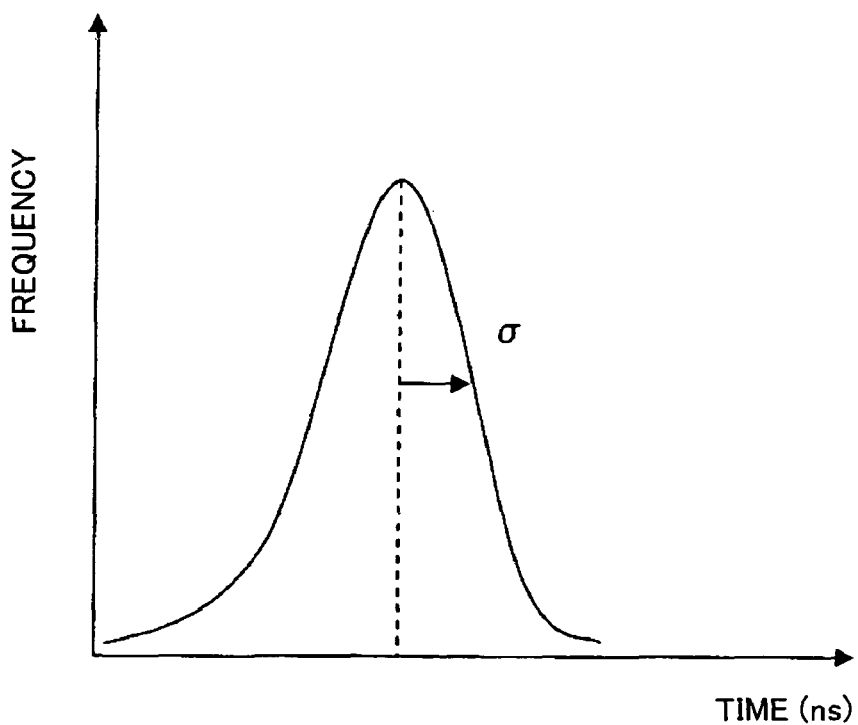
FIG. 2 is a diagram for explaining jitter of the pre-pits.

3T jitter and 11T jitter of the pre-pit are respectively preferably 50 ns or less, more preferably 45 ns or less. The jitter as used herein will be then described. FIG. 2 shows frequency distributions of the 3T signal and 11T signal. The σ shown in FIG. 2 denotes the jitter. The jitter represents a measure of signal quality, or shows the amount of variation when the length of each pit or the space between the pits is measured. This means that the smaller the jitter is the more uniform the length of each pit. While the jitter of the EFM signal may be 3T, 4T and so on up to 11T, the shortest jitter of 3T and the longest jitter of 11T are usually measured.

For the shape (the shortest pit length) of the pre-pit at the image-recording layer side and for the signal loaded on the pre-pit the CD standard is employed, because this standard is advantageous with respect to the manufacturing technology and know-how of CDs, and utilization of existing manufacturing facilities.

Respective layers are hereinafter explained, referring to the layer structure shown in FIG. 1 as an example.

Information Recording Layer

The information recording layer, a layer wherein coded information such as digital information (coded information) is recorded, is not particularly limited, and examples thereof include dye-containing, recordable, phase-transition, photomagnetic, and other layers. The information recording layer is preferably a dye-containing layer.

Since the optical disk recording apparatus and the optical disk system utilize laser light having a wavelength of in a range of 630 to 680 nm, the image recording layer is preferably capable of recording and reproducing recorded information by utilizing laser light having a wavelength of in a range of 630 to 680 nm.

Specific examples of the dyes contained in the dye-containing information recording layer include cyanine dyes, oxonol dyes, metal complex dyes, azo dyes, and phthalocyanine dyes. Preferable examples of the dyes among these include phthalocyanine dyes and oxonol dyes.

In addition, the dyes described in JP-A Nos. 4-74690, 8-127174, 11-53758, 11-334204, 11-334205, 11-334206, 11-334207, 2000-43423, 2000-108513, and 2000-158818 and others are used favorably.

Further, the recording material is not restricted to a dye, and organic compounds such as triazole compounds, triazine compounds, cyanine compounds, merocyanine compounds, aminobutadiene compounds, phthalocyanine compounds, cinnamic acid compounds, viologen compounds, azo compounds, oxonol benzoxazole compounds, and benzotriazole compounds may also be used favorably. Among these compounds, cyanine compounds, aminobutadiene compounds, benzotriazole compounds, and phthalocyanine compounds are used particularly favorably.

The information recording layer is formed by preparing a coating solution by dissolving the recording material such as dye, with a binder, and the like in a suitable solvent, then forming a coated layer by applying the coating solution onto a substrate, and drying. The concentration of the recording material in the coating solution for recording material is generally in the range of 0.01 to 15% by weight, preferably in the range of 0.1 to 10% by weight, more preferably in the range of 0.5 to 5% by weight, and particularly preferably in the range of 0.5 to 3 wt %.

The information recording layer can be formed by, for example, vapor deposition, sputtering, CVD, solvent application or the like. Among these, solvent application is preferable.

Examples of solvents for the coating solution include: esters, such as butyl acetate, ethyl lactate, or cellosolve acetate; ketones, such as methylethylketone, cyclohexanone, or methylisobutylketone; chlorinated hydrocarbons such as dichloromethane, 1,2-dichloroethane, or chloroform; amides such as dimethylformamide; hydrocarbons such as methylcyclohexane; ethers such as dibutylether, diethylether, tetrahydrofuran, or dioxane; alcohols such as ethanol, n-propanol, iso-propanol, n-butanol, or diacetone alcohol; fluorochemical solvents such as 2,2,3,3-tetrafluoropropanol; and glycol ethers such as ethylene glycol monomethylether, ethylene glycol monoethylether, or propylene glycol monomethylether.

With consideration to the solubility of dyes used, the solvents above may be used alone or in combinations of two or more. The coating solution may further contain various additives such as antioxidant, UV absorbent, plasticizer, or lubricant according to the intended use.

When binders are used, examples thereof binders include: natural organic polymers, such as gelatin, cellulose compounds, dextran, rosins, or rubbers; and synthetic organic polymers, including hydrocarbon resins such as polyethylene, polypropylene, polystyrene, or polyisobutylene, vinyl resins such as polyvinyl chloride, polyvinylidene chloride, or polyvinyl chloride-polyvinyl acetate copolymers, acrylic resins such as polymethyl acrylate or polymethyl methacrylate, initial condensates of thermosetting resins such as polyvinyl alcohol, chlorinated polyethylene, epoxy resin, butylal resin, rubber compounds, or phenol-formaldehyde resin; and the like.

If a binder is additionally used as the material for information recording layer, the amount of the binder used is generally in the range of 0.01 to 50 times the weight of dye, and is preferably 0.1 to 5 times the weight of dye.

Examples of methods of the solvent application include spraying, spin coating, dipping, roll coating, blade coating, doctor roll coating, and screen-printing. The information recording layer may be either a single layer or multiple layers. The thickness of the information recording layer is generally in the range of 10 to 500 nm, preferably in the range of 15 to 300 nm, and more preferably in the range of 20 to 150 nm.

The information recording layer may contain various discoloration inhibitors for improvement of the light fastness of the information recording layer. Commonly, a singlet-oxygen quencher is used as the discoloration inhibitor. Any known singlet oxygen quencher described in literature, including patent specifications, may be used. Typical examples thereof include those described in JP-A Nos. 58-175693, 59-31194, 60-18387, 60-19586, 60-19587, 60-35054, 60-36190, 60-36191, 60-44554, 60-44555, 60-44389, 60-44390, 60-54892, 60-47069, 68-209995, and 4-25492, Japanese Patent Application Publication Nos. 1-38680 and 6-26028, German Patent. No. 350399, and Nippon Kagakukaishi JP, October 1992, p. 1141, and others.

The amount of the discoloration inhibitor such as the singlet oxygen quencher is usually in the range of 0.1 to 50% by weight, preferably in the range of 0.5 to 45% by weight, more preferably in the range of 3 to 40% by weight, and particularly preferably in the range of 5 to 25% by weight relative to the amount of the dye contained in the information recording layer.

Specific examples of the materials for a phase-transition information recording layer include: Sb—Te alloy, Ge—Sb—Te alloy, Pd—Ge—Sb—Te alloy, Nb—Ge—Sb—Te alloy, Pd—Nb—Ge—Sb—Te alloy, Pt—Ge—Sb—Te alloy, Co—Ge—Sb—Te alloy, In—Sb—Te alloy, Ag—In—Sb—Te alloy, Ag—V—In—Sb—Te alloy, and Ag—Ge—In—Sb—Te alloy. Among them, Ge—Sb—Te alloy and Ag—In—Sb—Te alloy are preferable, as the layers thereof are re-recordable a great number of times. The thickness of the phase-transition information recording layer is preferably in the range of 10 to 50 nm and more preferably in the range of 15 to 30 nm.

The phase-transition information recording layer above can be formed, for example, by gas-phase thin film deposition methods such as sputtering or vacuum deposition.

First Substrate and Second Substrate

The first substrate and the second substrate for the optical recording medium according to the invention may be selected from various materials hitherto used as substrates for conventional optical recording media.

Examples of the substrate material include glass, acrylic resins such as polycarbonate or polymethyl methacrylate, polyvinyl chlorides such as polyvinyl chloride or vinyl chloride copolymers, epoxy resins, amorphous polyolefins and polyesters, and these resins may be used in combination if desired. These materials may be used in the film shape or the rigid plate shape. Among the materials above, polycarbonate is preferable from the perspective of humidity resistance, dimensional stability, cost and the like.

The thickness of each of the first substrate and the second substrate is preferably in the range of 0.3 to 0.9 mm and more preferably in the range of 0.4 to 0.8 mm. Use of substrates whereon grooves or servo signals for tracking are formed is preferable for the first substrate. Substrates having no groove or a servo signal for tracking thereon may be used for the first substrate. The half-width of the groove of the first substrate is preferably in the range of 280 to 450 μm and more preferably in the range of 300 to 420 nm. The depth of groove (groove depth) is preferably in the range of 15 to 150 nm and more preferably in the range of 25 to 130 nm.

The groove for tracking may be further formed on the second substrate in order to record an image having high accuracy. In such a case, a track pitch of the groove is preferably in a range of 0.3 to 200 μm, more preferably in a range of 0.4 to 100 μm, still more preferably in a range of 0.6 to 50 μm, and further preferably in a range of 1.5 to 50 μm in view of the distribution of intensity of recording laser.

When tracking is performed during image recording and a thickness of the substrate on the side from which laser light incidents is 0.6 mm, a depth of the groove is preferably in a range of 50 to 200 nm, more preferably in a range of 80 to 150 nm, and still more preferably in a range of 100 to 130 nm. A width of the groove is preferably in a range of 100 to 600 nm, more preferably in a range of 200 to 500 nm, and still more preferably in a range of 250 to 450 nm. The optimum range of a shape of the groove may vary depending on a wavelength of laser light, NA, a thickness of the substrate and the like.

An undercoat layer may be formed on the surface of the first substrate (the face whereon grooves are formed), for improving the planarity and adhesiveness, and preventing deterioration of the information recording layer.

Examples of materials for the undercoat layer include polymer materials such as polymethyl methacrylate, acrylic acid-methacrylic acid copolymers, styrene-maleic anhydride copolymers, polyvinyl alcohol, N-methylol acrylamide, styrene-vinyl toluene copolymers, chlorosulfonated polyethylene, nitrocellulose, polyvinylchloride, chlorinated polyolefin, polyester, polyimide, vinyl acetate-vinyl chloride copolymers, ethylene-vinyl acetate copolymers, polyethylene, polypropylene, or polycarbonate; and surface modification agents such as silane coupling agents. The undercoat layer can be prepared by preparing a coating solution by dissolving or dispersing the materials in a suitable solvent, and applying the coating solution onto a substrate surface by, for example, a suitable application method such as spin coating, dip coating, or extrusion coating.

The thickness of the undercoat layer is generally in the range of 0.005 to 20 μm and preferably in the range of 0.01 to 10 μm.

First Reflection Layer and Second Reflection Layer

A first reflection layer and a second reflection layer are may be formed adjacent to the information recording layer or the image recording layer for improvement of reflectance during reproduction of information. The light-reflecting material used for the reflection layer is a material having a higher reflectance of laser beam, and examples thereof include metals and semimetals such as Mg, Se, Y, Ti, Zr, Hf; V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, or Bi, and stainless steel. These materials may be used alone, in combinations of two or more in the forms of alloy. Among these materials, preferable are Cr, Ni, Pt, Cu, Ag, Au, Al and stainless steel. More preferable are metals of Au, Ag, or Al and alloys thereof, and particularly preferable are metals of Ag or Al and alloys thereof. The reflection layer is formed on the substrate or the information recording layer by, for example, vapor deposition, sputtering, or ion plating of the above-described light-reflecting material. The thickness of the reflection layer is generally in the range of 10 to 300 nm and preferably in the range of 50 to 200 nm.

Adhesive Layer

The adhesive layer is exemplary shown in FIG. 1 as the layer which resides between the first lamination body 520 and the second lamination body 528 and is formed for adhering the first reflection layer 516 and the second reflection layer 526. Examples of adhesives used for the adhesive layer include conventionally-known UV-curable resins.

Image Recording Layer

As described above, the optical disk of the invention has an image recording layer on a side which is opposite to the side on which the information recording layer is provided. Visible images (image information) desired by users, such as characters/letters, graphics, and pictures are recorded on the image recording layer. Examples of visible images include: the title of the disc; content information; thumbnails of the content; related pictures; pictures for design of the disc; copyright information; recording date; recording method; recording format; bar codes; and the like.

The visible image to be recorded in the image recording layer means an image visually recognizable, and examples thereof include all visually recognizable information such as any characters/letters (lines), picture, and graphics. Examples of character/letter information include authorised user identification information, expiration date information, designated allowable number of times of use information, rental information, resolution-specifying information, layer-specifying information, user-specifying information, copyright holder information, copyright number information, manufacturer information, production date information, sales date information, dealer or seller information, usage set-number information, area identification information, language-specifying information, application-specifying information, product user information, and usage number information.

The only requirement of the image-recording layer is to be able to visibly record image information such as character, image, and picture by irradiation of laser light. The dyes described in the above explanation about the information recording layer can also be preferably used as the material for forming the image-recording layer.

In the optical disk according to the invention, the components for the information-recording layer (colorant or phase-change recording material) and the components for the image-recording layer may be the same as each other or different from each other, but are preferably different from each other, because the required properties of the information-recording layer and the image-recording layer are different. Specifically, components superior in recording and reproduction characteristics are favorably used as the components for information-recording layer, while components effective in increasing the contrast of the recorded image are favorable as the components for image-recording layer. Examples of the dye that is used in the image recording layer and is preferable in view of improving contrast of the recorded image include cyanine dyes, phthalocyanine dyes, azo dyes, azo metal complex dyes, and oxonol dyes.

Leuco dyes may also be used. Specific examples of the preferable dyes include crystal violet lactone; phthalide compounds such as 3,3-bis(1-ethyl-2-methylindol-3-yl)phthalide and 3-(4-diethylamino-2-ethoxyphenyl)-3-(1-ethyl-2-methylindol-3-yl)-4-azaphthalide;

fluorane compounds such as 3-cyclohexylmethylamino-6-methyl-7-anilinofluorane, 2-(2-chloroanilino)-6-dibutylaminofluorane, 3-diethylamino-6-methyl-7-anilinofluorane, 3-diethylamino-6-methyl-7-xylidinofluorane, 2-(2-chloroanilino)-6-diethylaminofluorane, 2-anilino-3-methyl-6-(N-ethylisopentylamino)fluorane, 3-diethylamino-6-chloro-7-anilinofluorane, 3-benzylethylamino-6-methyl-7-anilinofluorane, or 3-methylpropylamino-6-methyl-7-anilinofluorane; and the like.

The image recording layer can be formed by preparing a coating solution by dissolving the above-described dye in a solvent and applying the coating solution on a substrate. The solvents which can be used for preparation of the coating solution for information recording layer, described below, can also be used for preparing the coating solution for forming the image recording layer. Other additives, application method, and the like can be similar to those for the information recording layer described below.

The thickness of the image recording layer is preferably 0.01 to 200 µm, more preferably 0.05 to 100 µm, and still more preferably 0.1 to 50 µm.

Protective Layer

A protective layer may be formed for physical and chemical protection of the reflection layer, the information recording layer or the image recording layer.

Examples of materials for use in the protective layer include: inorganic materials such as ZnS, ZnS—$SiO_2$, SiO, $SiO_2$, $MgF_2$, $SnO_2$, or $Si_3N_4$; and organic materials such as thermoplastic resins, thermosetting resins, or UV-curing resins.

When a thermoplastic or thermosetting resin is used for forming the protective layer, the layer may be formed by preparing a coating solution by dissolving the resin in a suitable solvent, applying the coating solution, and drying the coated solution to form a film. When a UV-curing resin is used for forming the protective layer, the layer may be formed by using the resin as it is or preparing a coating solution by dissolving the resin in a suitable solvent, applying the coating solution, and curing the resin by UV ray irradiation. The coating solution may further contain various additives such as antistatic agent, antioxidant, or UV absorbent according to the application. The thickness of the protective layer is generally in the range of 0.1 µm to 1 mm.

As described above, the optical disk according to the invention may be applied to so-called play-back only optical recording media that have a recording area (pit) where information reproducible by laser beam is recorded in the first substrate.

The optical disk of the invention is a disk which can be used for the optical disk system, the method for drawing images and the optical disk recording apparatus described below. Next, the optical disk recording apparatus and the method for drawing images will be described, and the optical disk system of the invention will be described thereby.

Optical Disk Recording Apparatus

The optical disk recording apparatus provided by the invention is a reading device which irradiates a laser light having a wavelength of in a range of 630 to 680 nm to an optical disk including, on a substrate having pre-pits with a shortest pit length that is in a range from 0.6 to 0.9 µm, an image-recording layer capable of having an image drawn thereon by irradiating a laser light, and a reading device which reads information included in the pre-pits by return light of the laser light when the laser light having a wavelength of in a range of 630 to 680 nm is irradiated to the pre-pits of the optical disk.

The method for drawing an image on the optical disk provided by the invention comprises irradiating a laser light having a wavelength of in a range of 630 to 680 nm to an optical disk comprising, on a substrate having pre-pits with a shortest pit length that is in a range from 0.6 to 0.9 µm, an image-recording layer capable of having an image drawn thereon by irradiating laser light, reading information included in the pre-pits by return light of the laser light when the laser light having a wavelength of in a range of 630 to 680 nm is irradiated to the pre-pits of the optical disk, and drawing the image in accordance with the information included in the pre-pits.

In the optical disk according to the invention, image recording on the image recording layer and optical information recording on the information recording layer thereof can be performed by using a single optical disk drive (recording device) capable of recording information on both layers. When only one optical disk drive is used in this manner, information is first recorded on either an image recording layer or an information recording layer and then, after the optical disk is reversed, information is further recorded on the other layer.

A preferable embodiment of the optical-disk recording apparatus using the optical disk according to the invention described above is (1) an optical-disk recording apparatus, recording information by irradiating a recording face (e.g., colorant recording layer (recording layer)) of an optical disk with a laser beam, comprising: an optical pickup irradiating the optical disk with a laser beam; an irradiation-position adjusting device of adjusting the position on the optical disk of the laser beam irradiated by the optical pickup; an image-formation controlling device, controlling the optical pickup and the irradiation-position adjusting device so that, when an optical disk having the recording layer on one face and an image-recording layer on the other face is placed with the image-recording layer facing the optical pickup, a visible image corresponding to image information is formed on the image-recording layer of the optical disk; and a beam-spot controlling device of controlling the optical pickup so that, when the visible image is formed, the beam spot diameter of the laser beam from the optical pickup irradiating the image-recording layer becomes larger than the beam spot diameter of the laser beam from the optical pickup irradiation the recording face during information recording.

In the configuration (1) above, it is possible to form a visible image corresponding to image data by irradiating the image-recording layer of optical disk with laser beam according to the image data, because the reflectivity of the image-recording layer changes image wise according to changes in the absorbance of the image-recording layer. By widening the beam spot diameter of the laser beam irradiated on the image-recording layer of the optical disk during formation of the visible image, it is possible to irradiate a wider region with the laser beam in one rotation of the optical disk and shorten the duration needed for forming a visible image. The optical disk according to the invention described above also allows recording of a preferable visible image even by such a method.

Another preferable embodiment of the optical-disk recording apparatus is (2) an optical-disk recording apparatus, recording information by irradiating a recording face of an optical disk with a laser beam, comprising: an optical pickup irradiating the optical disk with the laser beam; an irradiation-position adjusting device, adjusting the position on the optical disk of the laser beam irradiated by the optical pickup; a device of controlling the optical pickup and the irradiation-position adjusting device so that, when an optical disk having the recording face on one face and the image-recording layer on the other face is placed with the image-recording layer facing the optical pickup, a visible image corresponding to image information is formed on an image-recording layer of the optical disk, and the irradiation-position adjusting device also controlling the intensity of the laser beam of the optical pickup irradiating the image-recording layer on the basis of the image information to a first intensity, at which the image-recording layer substantially does not change, or a second intensity, larger than the first intensity and at which the image-recording layer does change; and a servo device, detecting information related to the laser beam irradiated to the optical disk by the optical pickup and controlling the optical pickup to irradiate a desired laser beam based on the detected result, wherein, when a duration of the laser beam, irradiated according to control based on the image information from the optical pickup continuously at the second intensity, exceeds a specific duration, the image-formation controlling device controls the intensity of the laser beam irradiated from the optical pickup to the first intensity for a specific duration independently of the content of the image information, and the servo device controls the optical pickup based on the detected result of information related to the laser beam irradiated at the first intensity.

In the configuration (2) above, it is possible to form a visible image corresponding to image data by irradiating the image-recording layer of an optical disk with a laser beam according to the image data, because the reflectivity of the image-recording layer changes imagewise according to changes in the absorbance of the image-recording layer. During formation of the visible image, when the intensity of the laser beam for image data is sustained at the second intensity, that leads to change of the image-recording layer, for an extended period of time, control is made of the laser beam to the laser beam at the first intensity, that leads to almost no change of the image-recording layer, independently of the image data. Thus, it is possible to control the laser beam based on the irradiation result. An optical disk according to the invention described above is also able to undergo recording of a preferable visible image even by such a method.

Yet another preferable embodiment of the optical-disk recording apparatus is (3) an optical-disk recording apparatus, recording information by irradiating a recording face of an optical disk with a laser beam, comprising: an optical pickup, irradiating the optical disk with the laser beam; an irradiation-position adjusting device, adjusting the position on the optical disk of the laser beam irradiated by the optical pickup; an image-formation controlling device, controlling the optical pickup and the irradiation-position adjusting device so that, when an optical disk having the recording face on one face and the image-recording layer on the other face is placed with the image-recording layer facing the optical pickup, a visible image corresponding to image information is formed on the image-recording layer of the optical disk; and a relative-position adjusting device, adjusting the relative position of the optical pickup and the face of the optical disk facing the optical pickup when the optical disk is set in the optical-disk recording apparatus, based on whether the face of the optical disk facing the optical pickup is the image-recording layer or is the recording face.

In the configuration (3) above, it is possible to form a visible image corresponding to image data by irradiating the image-recording layer of an optical disk with a laser beam according to the image data because the reflectivity of the image-recording layer changes imagewise according to changes in the absorbance of the image-recording layer. It is possible to adjust the relative position between the optical pickup and the face facing the optical pickup, based on whether the image-recording layer or the recording face is placed facing the optical pickup when the optical disk is set. Thus, it is possible to eliminate problems such as the inability to undertake various controls, for example focus control, due to a difference in the distance between the optical pickup and the face facing the same, even if the distance thereof is different depending on whether the recording face or the image-recording layer is placed facing the optical pickup. The optical disk according to the invention described above also allows recording of a preferable visible image even in such a method.

Yet another preferable embodiment of the optical-disk recording apparatus is (4) an optical-disk recording apparatus, recording information by irradiating a recording face of an optical disk with a laser beam, comprising: an optical pickup, irradiating the optical disk with the laser beam; an irradiation-position adjusting device, adjusting the position on the optical disk of the laser beam irradiated by the optical pickup; a servo device, controlling, based on the reflected laser beam from the optical disk irradiation, the irradiation-position adjusting device to make the optical pickup irradiate the laser beam along guide grooves when an optical disk, having a recording face on one face and an image-recording layer on the other face, and having helical guide grooves formed on the recording face, is set with the image-recording layer facing the optical pickup; and an image-formation controlling device, controlling the laser beam irradiated from the optical pickup so that a visible image corresponding to image information is formed on the image-recording layer of the optical disk while the irradiation position of the laser beam is being moved along the guide grooves by the servo device. An optical disk according to the invention described above is also able to undergo recording of a preferable visible image even by such a method.

In the configuration (4), it is possible to form a visible image corresponding to image data by irradiating the image-recording layer of optical disk with a laser beam according to the image data, because the reflectivity of the image-recording layer changes imagewise according to changes in the absorbance of the image-recording layer. It is possible in this case to form a visible image on the recording face without complicated laser-beam-irradiation-position control, detecting the guide grooves formed on the recording face and altering the laser-beam irradiation position along the detected guide grooves.

Yet another preferable embodiment of the optical-disk recording apparatus is (5) an optical-disk recording apparatus, recording information by irradiating a recording face of an optical disk with laser a beam, comprising: an optical pickup irradiating the optical disk with the laser beam; a rotation drive device, rotating the optical disk; a clock signal output device, outputting a clock signal at a frequency corresponding to the rotation speed of the optical disk rotated by the rotation drive device; an image-formation controlling device, controlling the optical pickup so that, when an optical disk having a recording layer on one face and an image-recording layer on the other face is set with the image-recording layer facing the optical pickup, a visible image corresponding to image information is formed on the image-recording layer of the optical disk, the image-formation controlling device also controlling the laser beam irradiated from the optical pickup based on the image information sent in each clock-signal cycle from the signal output device; a rotation detecting device, detecting one rotation from the reference position of the optical disk as driven by the rotation drive device; and an irradiation-position adjusting device, altering the irradiation position of the laser beam from the optical pickup a predetermined radial distance of the optical disk set in the optical-disk recording apparatus when one rotation of the optical disk from the predetermined reference position is detected by the rotation detecting device, while the laser beam is being irradiated from the optical pickup for forming the visible image on the image-recording layer of the optical disk.

In the configuration (5), it is possible to form a visible image corresponding to image data by irradiating the image-recording layer of optical disk with a laser beam according to the image data, because the reflectivity of the image-recording layer changes imagewise according to changes in the absorbance of the image-recording layer. Because, when forming the visible image, laser-beam irradiation control for forming the visible image is performed for each clock-signal cycle at a frequency corresponding to the rotational velocity of optical disk, i.e., each time the optical disk rotates a specific angle, a visible image can be formed with image data with contents (e.g., density) corresponding to the positions at the specific angles on the optical disk. An optical disk according to the invention described above is able to undergo recording of a preferable visible image even by such a method.

Yet another embodiment of the optical-disk recording apparatus is (6) an optical-disk recording apparatus, recording information by irradiating the recording face of an optical disk with a laser beam comprising: an optical pickup irradiating the optical disk with the laser beam; a rotation drive device, rotating the optical disk; a rotation detecting device, detecting one rotation by the rotation drive device of the optical disk, from a reference position; an image-formation controlling device, controlling the optical pickup so that, when an optical disk having a recording layer on one face and an image-recording layer on the other face is placed with the image-recording layer facing the optical pickup, a visible image corresponding to image information is formed on the image-recording layer of the optical disk; and an irradiation-position adjusting device, altering the irradiation position of the laser beam from the optical pickup a predetermined radial distance of the optical disk set in the optical-disk recording apparatus when one rotation of the optical disk from the predetermined reference position is detected by the rotation detecting device, while the laser beam is being irradiated from the optical pickup for forming the visible image on the image-recording layer of the optical disk; wherein the image-formation controlling device controls the optical pickup so as to irradiate the laser beam for forming the visible image on the optical disk rotated by the rotation drive device from the predetermined reference position of the image-recording layer, and controls so as not to irradiate the laser beam for forming the visible image onto a region from a position a particular distance prior to the predetermined reference position up to the predetermined reference position of the optical disk.

In the configuration (6), it is possible to form a visible image corresponding to image data, by irradiating the image-recording layer of optical disk with a laser beam according to the image data because the reflectivity of the image-recording layer changes imagewise according to changes in the absorbance of the image-recording layer. A visible image is formed by irradiating the optical disk from the reference position of the optical disk with the laser beam while the optical disk is rotated during formation of the visible image; and no laser beam for forming a visible image is irradiated on the region immediately before the laser-beam irradiation position returns back to the reference position. Thus, even when the laser-beam irradiation position control is somehow disturbed, for example, by unstable rotation of the optical disk, or when a laser beam is irradiated on the optical disk from the reference position for one rotation and goes back to its original irradiation reference position and the irradiation position of the laser beam goes to a position overlapping with where the laser beam has already been irradiated, it is possible to prevent irradiation of the visible image forming laser beam fat that position, and consequently, to improve the quality of the formed visible image.

Yet another embodiment of the optical-disk recording apparatus is (7) an optical-disk recording apparatus, recording information by irradiating a recording face of an optical disk with a laser beam, comprising: an optical pickup irradiating the optical disk with the laser beam; an irradiation-position adjusting device, adjusting the position on the optical disk of the laser beam irradiated by the optical pickup; a disk identifying device, obtaining disk identification information for identifying the kind of the optical disk set in the optical-disk recording apparatus; an image-formation controlling device, controlling the optical pickup and the irradiation-position adjusting device so that, when an optical disk having a recording layer on one face and an image-recording layer on the other face is placed with the image-recording layer facing the optical pickup, a visible image corresponding to image information is formed on the image-recording layer of the optical disk, and the image-formation controlling device also controlling the optical pickup and the irradiation-position adjusting device according to the kind of the optical disk identified by the disk identifying device.

In the configuration (7), it is possible to form a visible image corresponding to image data by irradiating the image-recording layer of optical disk with a laser beam according to the image data because the reflectivity of the image-recording layer changes imagewise according to changes in the absorbance of the image-recording layer. It is possible to control the conditions of forming the visible image according to the kind of the disk that has been set during formation of the visible image.

Yet another embodiment of the optical-disk recording apparatus is (8) an optical-disk recording apparatus having an optical pickup irradiating the optical disk with a laser beam, a modulation device, modulating information supplied from outside, and a laser beam control device, controlling the laser bean irradiated from the optical pickup according to the information supplied from the modulation device, further comprising: a modulation prohibiting device, prohibiting modulation of the image information supplied from outside by the modulation device when a visible image is formed on an image-recording layer of an optical disk having a recording face on one face and the image-recording layer on the other face; and an image-formation controlling device, controlling the laser beam, when the optical disk is set with the image-recording layer facing the optical pickup, so that a visible image corresponding to the image information not modulated by the modulation device is formed on the image-recording layer of the optical disk.

In the configuration (8), it is possible to form a visible image corresponding to image data by irradiating the image-recording layer of optical disk with a laser beam according to the image data, because the reflectivity of the image-recording layer changes imagewise according to changes in the absorbance of the image-recording layer. The image data is not modulated during formation of the visible image, because the modulation of the recording data by the modulation device is prohibited when information is being recorded on the recording face. Thus, there is no need to install an additional data transfer device for forming a visible image according to the image data, and for that purpose common use of the data transfer device used in recording information on the recording face can made.

Yet another preferable embodiment of the optical-disk recording apparatus is (9) an optical-disk recording apparatus, recording information by irradiating a recording face of an optical disk with a laser beam, comprising: an optical pick up of irradiating the optical disk with the laser beam; an irradiation-position adjusting device, adjusting the irradiation position on the optical disk of the laser beam irradiated by the optical pickup; and an image-formation controlling device, controlling the optical pickup and the irradiation-position adjusting device so that, when an optical disk having a recording face on one face and an image-recording layer on the other face is set with the image-recording layer facing the optical pickup, a visible image corresponding to image information is formed on the image-recording layer of the optical disk, wherein the image-formation controlling device controls the laser beam irradiated from the optical pickup according to the gradation indicated in the image information.

In the configuration (9), it is possible to form a visible image corresponding to the image data by irradiating the image-recording layer of optical disk with a laser beam according to the image data, because the reflectivity of the image-recording layer changes imagewise according to changes in the absorbance of the image-recording layer. It is possible during formation of the visible image to control the laser beam at each position (each set of coordinates) on the image-recording layer and form a visible image with gradations according to the gradations indicated in the image data.

Yet another preferable embodiment of the optical-disk recording apparatus is (10) an optical-disk recording apparatus, recording information by irradiating a recording face of an optical disk with laser beam, comprising: a rotating device, rotating the optical disk; an optical pickup, irradiating from one face the optical disk rotated by the rotating device with a laser beam, the optical pickup being movable in substantially a radial direction of the optical disk; and a laser-beam-level controlling device, adjusting the laser beam irradiated from the optical pickup when a visible image is formed on the image-recording layer, based on the image data related to the visible image to be formed, the laser-beam-level controlling device adjusting the level of the laser beam irradiated from the optical pickup either to a first intensity, causing substantially no change in the recording and image-recording layers of the optical disk, or to a second intensity, causing substantially no change in the recording layer but causing a change in color in the image-recording layer.

In the apparatus (10), it is possible to record information on a recording layer of an optical disk according to the invention by irradiation of a laser beam and form a visible image on an image-recording layer in a similar manner to conventional methods. Further, it is also possible to record information and form an image on one face of an optical disk by irradiation of a laser beam from the same single side, eliminating the tedious operations of turning over and resetting the optical disk by the user.

The image-forming process of forming an image in the image-recording layer of an optical disk according to the invention is a method of forming a visible image on an image-recording layer formed on the face of an optical disk that is opposite to the recording face by using an optical-disk recording apparatus having an optical pickup, recording information on the recording face of an optical disk by irradiation of a laser beam, wherein the optical pickup controls the irradiated laser beam so that a visible image corresponding to image information is formed on the image-recording layer of the optical disk while the irradiation position of the laser beam from the optical pickup is being moved along a predetermined helical or concentric route. When a region, containing a predetermined number of sub-regions along the route in each of radial sector regions dividing the optical disk, is called a unit region, the timing of the laser beam irradiated at each sub-region along the route belonging to one of the unit regions is controlled so that by the density of the unit regions the visible image is displayed.

It is possible, by this method, to form a visible image corresponding to the image data by irradiating the image-recording layer of optical disk with laser beam according to the image data, because the reflectivity of the image-recording layer changes imagewise according to changes in the absorbance of the image-recording layer. It is possible during formation of the visible image to control the laser beam at each position (set of coordinates) on the image-recording layer and form a visible image with gradations according to the gradations indicated in the image data.

Typical Configuration of Optical Disk Recording Apparatus According to the Invention The optical-disk recording apparatus is an optical-disk recording apparatus recording information by irradiating the recording face of an optical disk with a laser beam that has a function for recording information on the recording face and also a function for forming a visible image corresponding to the image data by irradiating with a laser beam an image-recording layer of an optical disk having an image-recoding layer formed on the face opposite to the recording face. In such an apparatus, it is possible to record a visible image not only on the image-recording layer but also on the recording layer for recording normal digital data, if the optical disk contains a particular colorant.

Example of the Configuration of Optical Disk Recording Apparatus

Figure 3:
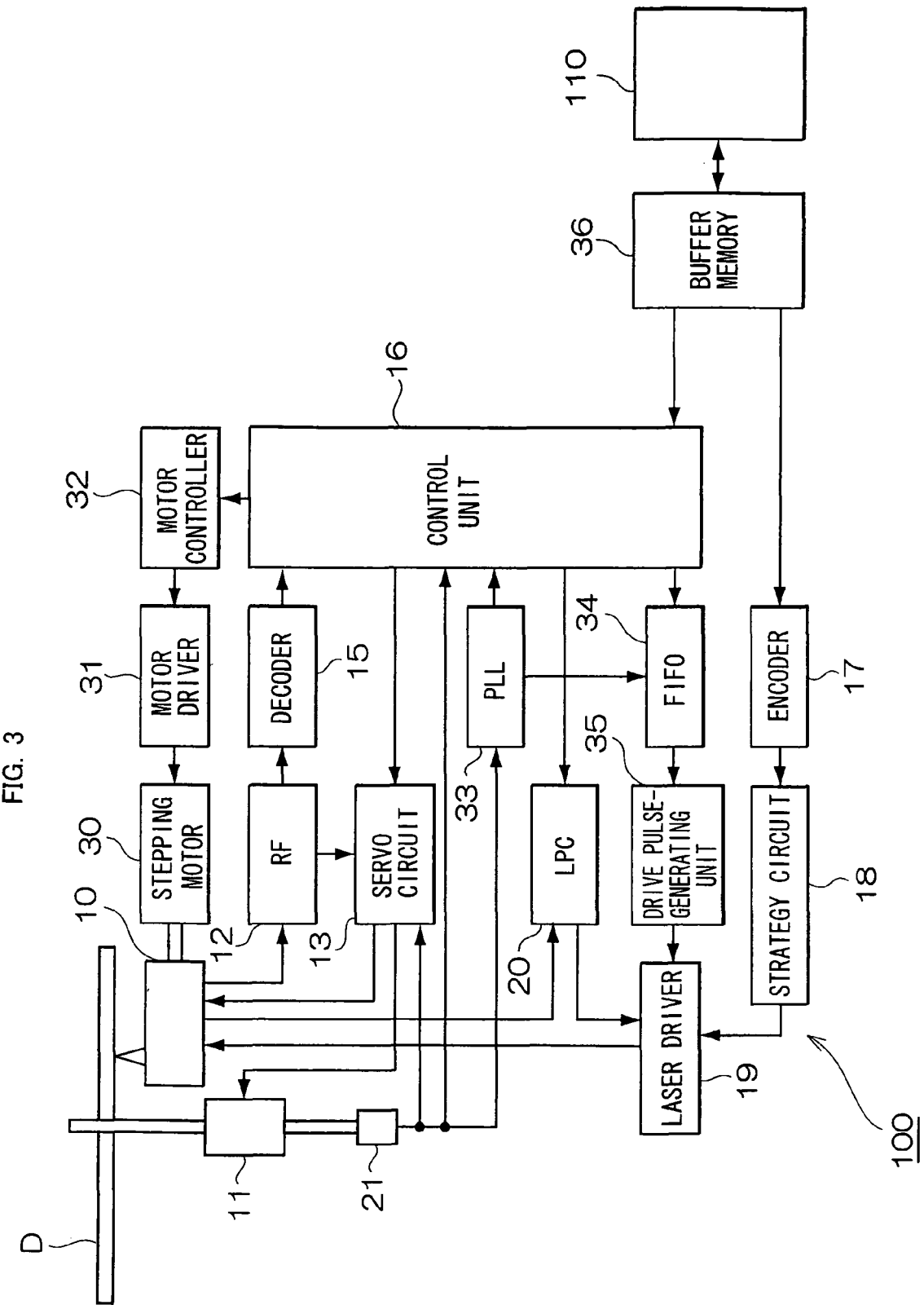
FIG. 3 is a block diagram showing an example of the construction of an optical disk recording apparatus capable of handling the optical disk of the invention.
Figure 9:
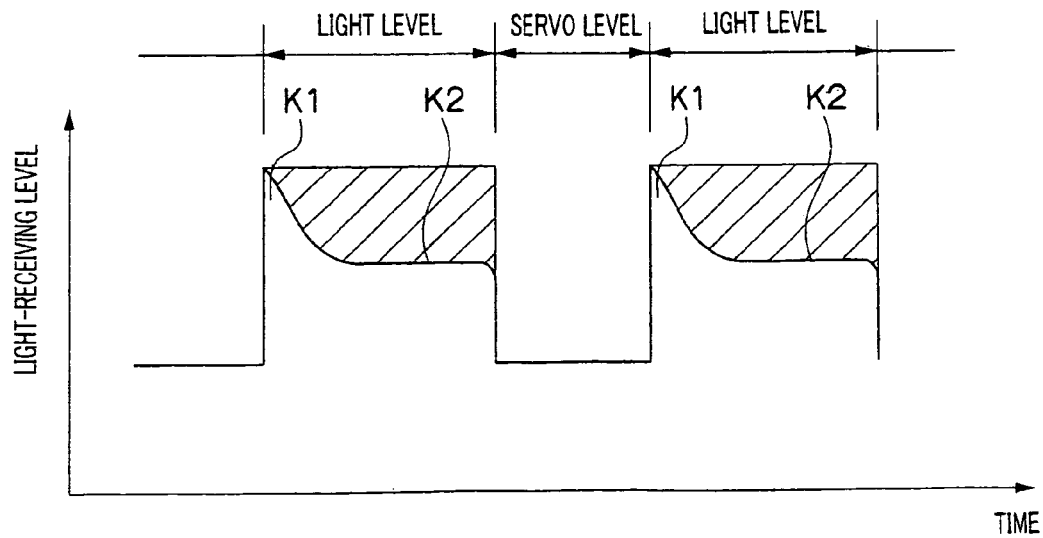
FIG. 9 shows return light of the laser light irradiated to the image-recording layer of the optical disk from an optical pick-up of the optical disk recording apparatus.

FIG. 3 is a block diagram illustrating the configuration of an optical-disk recording apparatus. As shown in FIG. 9, the optical-disk recording apparatus 100 is connected to a host personal computer (PC) 110, and has an optical pickup 10, a spindle motor 11, a RF (Radio Frequency) amplifier 12, a servo circuit 13, a decoder 15, a control unit 16, an encoder 17, a strategy circuit 18, a laser driver 19, a laser power-controlling circuit 20, a frequency generator 21, a stepping motor 30, a motor driver 31, a motor controller 32, a PLL (Phase Locked Loop) circuit 33, a FIFO (First In First Out) memory 34, a drive pulse-generating unit 35, and a buffer memory 36.

The spindle motor 11 is a motor rotating and driving the optical disk D on which the data is recorded, and the rotating speed is controlled by the servo circuit 13. In the optical-disk recording apparatus 100 of this embodiment, which operates under the CAV (Constant Angular Velocity) mode, the spindle motor 11 rotates at the constant angular velocity instructed from, for example, the control unit 16.

Figure 4:
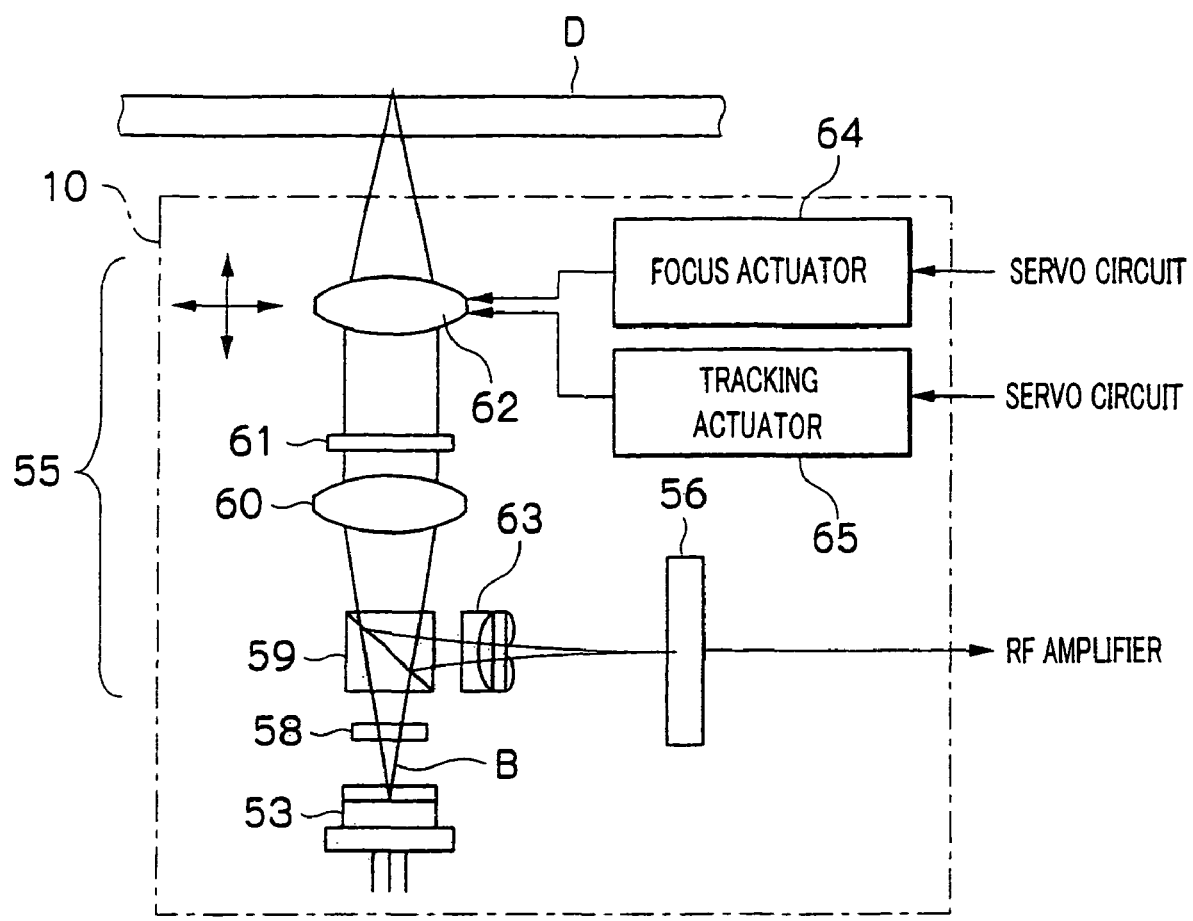
FIG. 4 shows the construction of an optical pick-up as a constituting element of the optical disk recording apparatus.
Figure 10:
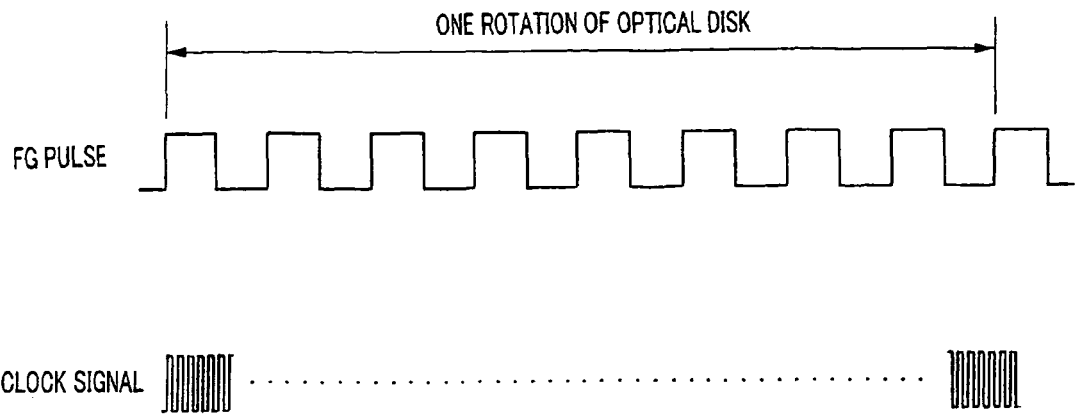
FIG. 10 shows an FG pulse formed depending on the rotation speed of a spindle motor by a frequency generator as a constituting element of the optical recording apparatus, and a clock signal formed based on the FG pulse.

The optical pickup 10 is a unit irradiating the optical disk D, rotated by the spindle motor 11, with a laser beam, and the configuration thereof is shown in FIG. 4. As shown in FIG. 10, the optical pickup 10 has a laser diode 53, emitting a laser beam B, a diffraction grating 58, an optical system 55 condensing the laser beam B onto the face of the optical disk D, and a light-receiving device 56 receiving the reflected light. The optical pick-up 10 emits a laser light with a wavelength in a range of 630 to 680 nm.

In the optical pickup 10, the laser diode 53 emits a laser beam B according to the intensity of the drive current supplied from the laser driver 19 (see FIG. 3). The optical pickup 10 divides the laser beam emitted from the laser diode 53 into a main beam, an advance beam and a delayed beam by the diffraction grating 58, and converges the three laser beams, via a polarized beam splitter 59, collimator lens 60, a quarter wavelength plate 61, and an object lens 62, onto the surface of the optical disk D. The three laser beams reflected from the surface of the optical disk D are then transmitted through the object lens 62, the quarter wavelength plate 61, and the collimator lens 60, reflected by the polarized beam splitter 59, and sent, via a cylindrical lens 63, into the light-receiving device 56. The light-receiving device 56 outputs a photo-reception signal and this is then supplied via the RF amplifier 12 (see FIG. 4), to the control unit 16 and the servo circuit 13.

The object lens 62 is movable in the optical-axis direction of the laser beam B and in the radial direction of the optical disk D, and is held by a focus actuator 64 and a tracking actuator 65. The focus actuator 64 and the tracking actuator 65 move the object lens 62 in the optical-axis and radial directions respectively according to the focus error signal and the tracking error signal supplied from the servo circuit 13 (see FIG. 3). The servo circuit 13 generates the focus error signal and the tracking error signal according to the photo-reception signal supplied from the light-receiving device 56 and the RF amplifier 12, and performs focus control and tracking control by relocating the object lens 62 as described above.

The optical pickup 10 has a front monitor diode not shown in FIG. 4; when the laser diode 53 emits laser beam, a current is generated in the front monitor diode that received the outgoing light, and current is supplied, via the optical pickup 10, to the laser power-controlling circuit 20 shown in FIG. 3.

The RF amplifier 12 amplifies the EFM (Eight to Fourteen Modulation)-modulated RF signal supplied from the optical pickup 10, and outputs the amplified RF signal to the servo circuit 13 and the decoder 15. During reproduction, the decoder 15 demodulates the EFM-modulated RF signal supplied from the RF amplifier 12 and generates reproduction data.

An instruction signal from the control unit 16, a FG pulse signal at a frequency corresponding to the rotation speed of the spindle motor 11 supplied from the frequency generator 21, and the RF signal from the RF amplifier 12 are supplied to the servo circuit 13. The servo circuit 13 performs rotation control of the spindle motor 11 and focus control and tracking control of the optical pickup 10, based on these supplied signals. The driving mode of the spindle motor 11, when information is recorded on the recording face of the optical disk D (see FIG. 1) or a visible image is formed on the image-recording layer of the optical disk D (see FIG. 1), may be a CAV (Constant Angular Velocity) mode of driving the optical disk D at a constant angular velocity, or a CLV (Constant Linear Velocity) mode of driving the optical disk at a constant recording linear velocity. The optical-disk recording apparatus 100 shown in FIG. 9 and below is operated under the CAV mode, in which the servo circuit 13 rotates the spindle motor 11 at the constant angular velocity instructed by the control unit 16.

The buffer memory 36 stores the information to be recorded on the recording face of the optical disk D (hereinafter, referred to as recording data) supplied from the host PC 110 and the information corresponding to the visible image to be formed on the image-recording layer of optical disk D (hereinafter, referred to as image data). The recording data stored in the buffer memory 36 are outputted to the encoder 17, while the image data to the control unit 16.

The encoder 17 EFM-modulates the recording data supplied from the buffer memory 36 and outputs the modulated data to the strategy circuit 18. The strategy circuit 18 performs time-base compensation of the EFM signal supplied from the encoder 17 and outputs the corrected data to the laser driver 19.

The laser driver 19 drives the laser diode 53 of the optical pickup 10 (see FIG. 4) with a signal modulated according to the recording data supplied from the strategy circuit 18 under the control of the laser power-controlling circuit 20.

The laser power-controlling circuit 20 controls the power of the laser irradiated from the laser diode 53 in the optical pickup 10 (see FIG. 4). Specifically, the laser power-controlling circuit 20 controls the laser driver 19 to make the optical pickup 10 emit a laser beam at the optimal laser power instructed by the control unit 16. The laser power control in the laser power-controlling circuit 20 is a feedback control for controlling a laser beam from the optical pickup 10 at a desirable intensity by using the current supplied from the front monitor diode in optical pickup 10.

Figure 5:
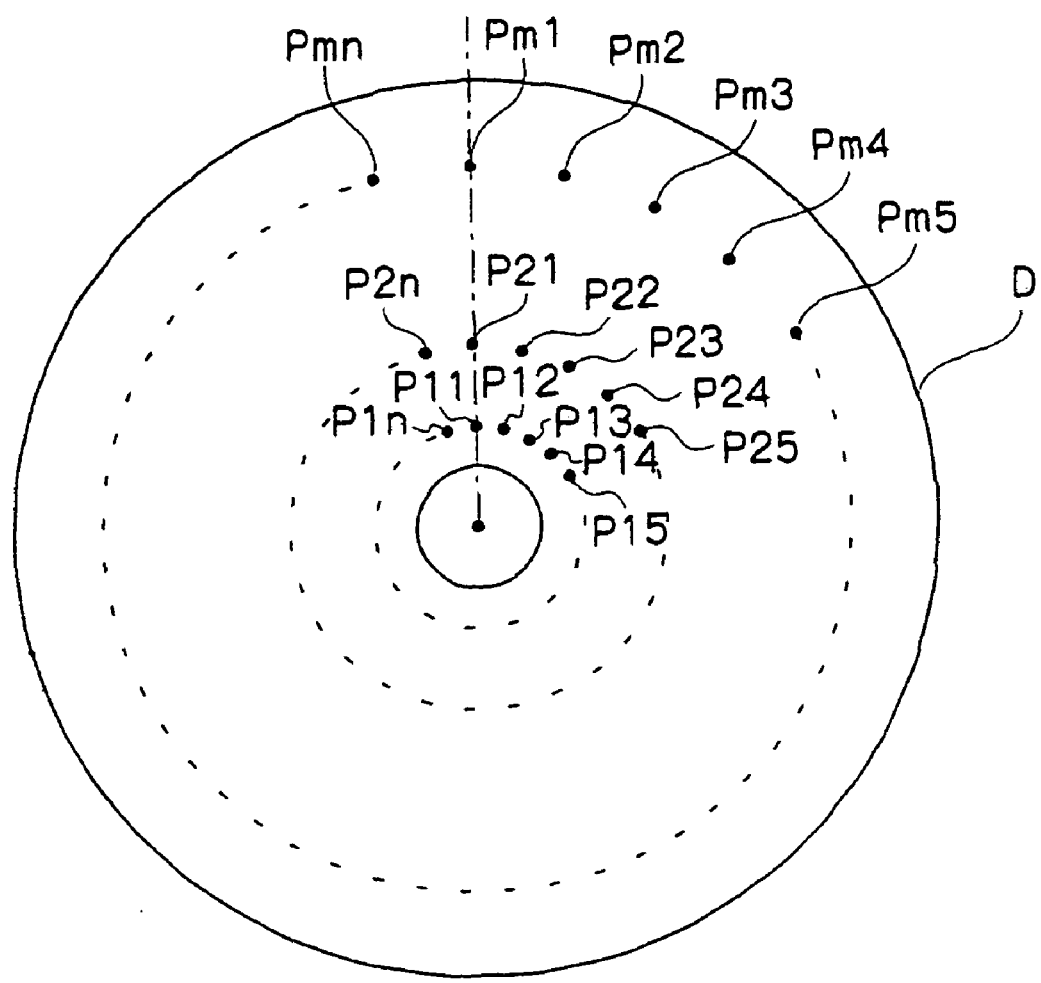
FIG. 5 is provided for describing the content of the image data used for forming a visible image on the image-recording layer of the optical disk according to the optical disk recording apparatus.

The image data, supplied from the host PC 110 and stored in the buffer memory 36, are sent via the control unit 16 to the FIFO memory 34 and stored therein. The image data stored in the FIFO memory 34, i.e., the image data supplied from host PG 110 to the optical-disk recording apparatus 100, contain the following information. The image data are data for forming a visible image on the surface of the disk-shaped optical disk D, and include information on the density of each of the n set of coordinates (shown as black spots in the Figure) on each of the multiple concentric circles around the center O on the optical disk D, as shown in FIG. 5. The image data are data including information on the density at these set of coordinates, from the sets of coordinates P11, P12 . . . P1n on the innermost circle, the sets of coordinates P21, P22 . . . 2n on the next circle, the sets of coordinates on the next circle, to sets of coordinates up to Pmn on the outermost circle; and the information containing the density at respective sets of coordinates is sent to the FIFO memory 34 in the above sequence. FIG. 5 is a schematic view illustrating the geographic relationship among the sets of coordinates, and actual sets of coordinates are placed at a density much denser than that shown in the Figure. When the image data for forming an image on the photosensitive face of the optical disk D are formed with common bitmap fonts in the host PC 110, the bitmap data are preferably converted to the data in polar coordinate form, and the converted image data are transmitted from the host PC 110 to the optical-disk recording apparatus 100.

As described above, a clock signal for image recording is supplied from the PLL circuit 33 to the FIFO memory 34 when a visible image is formed on the image-recording layer of optical disk D based on the image data supplied. Upon reception of the clock pulse of the clock signal for image recording, the FIFO memory 34 outputs the information on the gradation of the set of coordinates stored earliest, to the drive pulse-generating unit 35.

Figure 6A:
FIGS. 6A and 6B are provided for describing the content of irradiation control of the laser light for expressing the density of an image when the optical disk recording apparatus forms a visible image on the image-recording layer of the optical disk of the invention.
Figure 6B:
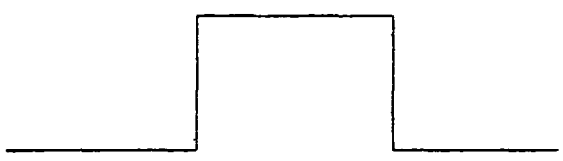

The drive pulse-generating unit 35 generates a drive pulse for controlling the timing of the laser-beam irradiation from the optical pickup 10 and the like. The drive pulse-generating unit 35 then generates a drive pulse at a pulse width corresponding to the information on the gradation of each set of coordinates supplied from the FIFO memory 34. For example, a drive pulse having a larger pulse width at the light level (second intensity) as shown in FIG. 6A is generated when the gradation at a set of coordinates is relatively large (higher density), while a drive pulse having a smaller pulse width at the light level when the gradation of the set of coordinates is relatively small, as shown in FIG. 6B. The light level is a power level at which irradiation of the laser beam causes change in the image-recording layer of optical disk D and thus in reflectivity thereof, and, when such a drive pulse is supplied to the laser driver 19, a laser beam at the light level is irradiated from the optical pickup 10 for the period according to the pulse width. Thus, a laser beam at the light level is irradiated for a longer period when the gradation is larger, and the reflectivity of the image-recording layer of optical disk D changes in the greater region of a unit region, and consequently, the users recognize visually that the region is a region higher in density. In the present embodiment, the density of the image data is displayed by making the length of the region where the reflectivity is changed per unit region (per unit length) variable. The servo level (first intensity) is a power level at which irradiation of the laser power causes almost no change in the image-recording layer of the image-recording layer of optical disk D, and a laser beam at the servo level is irradiated, instead of the laser beam at the light level, to the region where no change in the reflectivity is required.

Figure 7A:
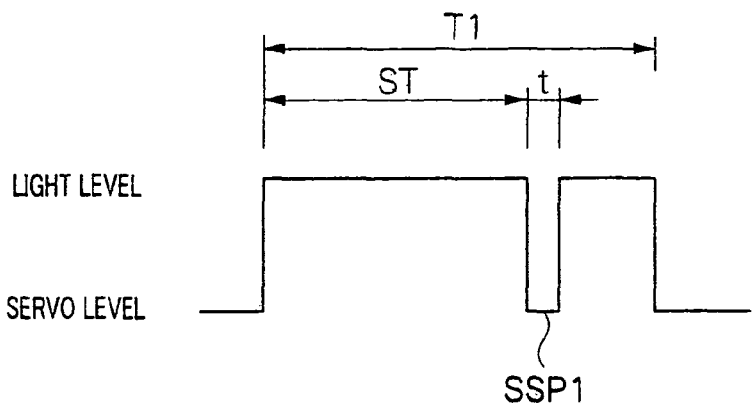
FIGS. 7A and 7B are provided for describing the control method of the laser light when the optical recording apparatus forms a visible image on the image-recording layer of the optical disk.
Figure 7B:
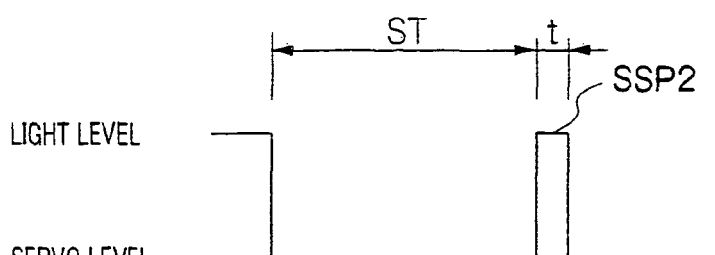

The drive pulse-generating unit 35 generates a drive pulse according to the information indicating the gradation of respective sets of coordinates described above, and, independently of the information indicating the gradation, inserts a pulse at the light level or at the servo level for a very short period, if needed, for laser power control by the laser power-controlling circuit 20 and for focus control and tracking control by the servo circuit 13. For example, as shown in FIG. 7A, if a laser beam at the light level should be irradiated for a period of T1 for displaying a visible image according to the gradation at a set of coordinates in the image data and the period T1 is longer than the servo cycle ST predetermined for control of the laser power, a servo system-off pulse (SSP1) for a very short period t is inserted at the point when the servo cycle ST elapsed after the pulse at the light level is generated. On the other hand, as shown in FIG. 7B, if it is necessary to irradiate a laser beam at the servo level for a period of servo cycle ST or more to display a visible image according to the gradation at a set of coordinates in the image data, a servo system-on pulse (SSP2) is inserted at the point when the servo cycle ST elapsed after the pulse at the servo level is generated.

Figure 8:
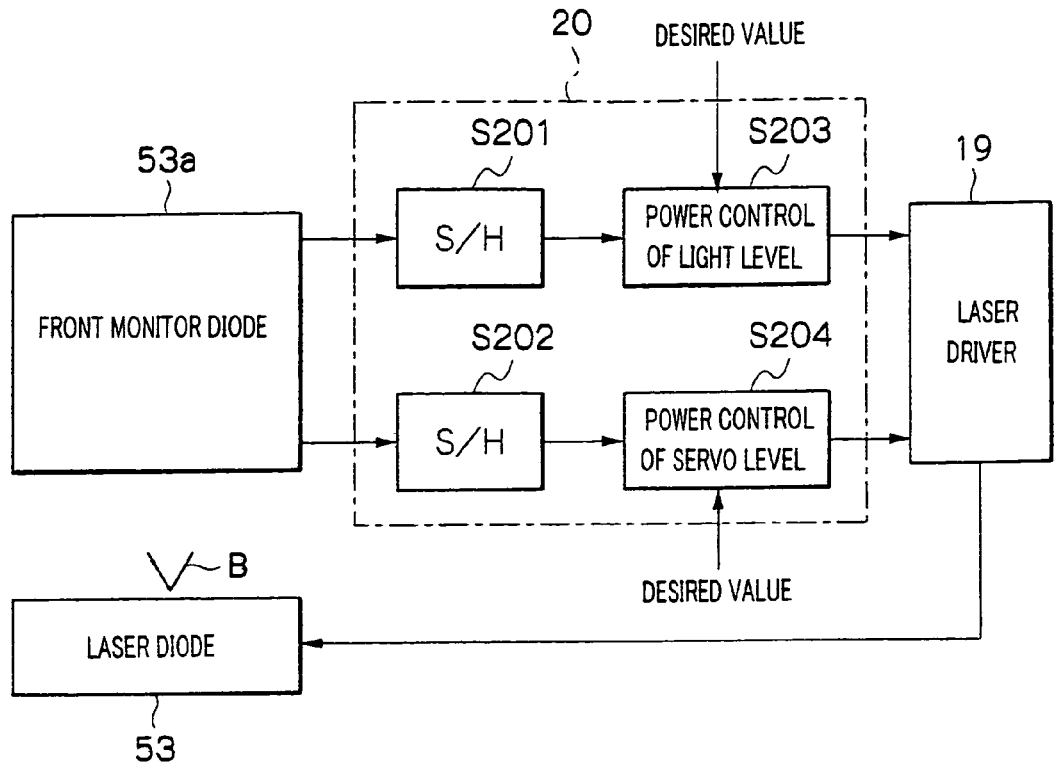
FIG. 8 is provided for describing the content of laser power control using a laser power control circuit as a constitution element of the optical disk recording apparatus.

As described above, the laser power control by the laser power-controlling circuit 20 is performed based on the current supplied from the front monitor diode (corresponding to the intensity of the irradiated laser beam) that receives the laser beam irradiated from the laser diode 53 in optical pickup 10 (see FIG. 4). More specifically, as shown in FIG. 8, the laser power-controlling circuit 20 sample-holds the value corresponding to the intensity of the irradiated laser beam detected by the front monitor diode 53a (S201 and S202). Based on the result of a sample held when a laser beam is irradiated at a light level of desired value (Al), i.e., when a drive pulse at the light level is generated (see FIGS. 6 and 7), the laser power-controlling circuit 20 performs laser power control (S203), so that the laser beam is irradiated at the light level of the desirable value supplied from the control unit 16. Alternatively, the laser power-controlling circuit 20 performs laser power control, to make the laser beam irradiated at the servo level of the desirable value supplied from the control unit 16 (S204), based on the result of sample held when a laser beam is irradiate at the servo level of desired value ($A_s$), i.e., when a drive pulse at the servo level is generated (see FIGS. 6 and 7). Thus, if the pulse at the light or servo level is not outputted for a period longer than a particular servo cycle ST (sample cycle), it is possible to perform the laser power control at each level by forcibly inserting a servo system-off pulse SSP1 or a servo system-on pulse SSP2, independently of the content of the image data as described above.

As described above, insertion of the servo system-off pulse SSP1 is not only for control of the laser power, but also for focus control and tracking control by the servo circuit 13. The tracking and focus control is performed, based on the RF signal detected by the light-receiving device 56 in optical pickup 10 (see FIG. 4), i.e., the return light (reflected light) from the optical disk D of the laser beam irradiated from the laser diode 53. FIG. 9 shows an example of a signal detected by the light-receiving device 56 when a laser beam is irradiated. As shown in FIG. 9, the reflected light when a laser beam at the light level is irradiated contains two components, a peak region K1 immediately after irradiation of laser beam and a shoulder region K2 where the light level is stabilized, and the hatched region in the Figure can be considered to be the energy used for forming an image in the image-recording layer. The energy used for forming an image in the image-recording layer is not always a stable value, and seems to fluctuate according to various conditions. Thus, the shape of the hatched region in the Figure seems to vary every time, and thus, it is not always possible to obtain stabilized reflected light from the laser beam at the light level, because the reflected light contains a lot of noise, and use of such a reflected light may inhibit accurate focus control and tracking control. Accordingly, as described above, if a laser beam at the light level is irradiated continuously for an long period it is not possible to obtain the reflected light of the laser beam at the servo level and consequently to perform accurate focus control and tracking control.

For that reason, as described above, the reflected light of the laser beam at the servo level is obtained periodically by inserting a servo system-off pulse SSP1, and the focus and tracking control is performed based on the obtained reflected light. Unlike when recording in the recording layer, it is not necessary to trace the previously formed pregrooves (guide grooves) or the like when a visible image is formed on the image-recording layer of optical disk D. Thus, in the present embodiment, the desired tracking control value is a fixed value (fixed offset voltage). Such a control method is applicable not only for formation of image information on an image-recording layer but also for forming image information on a recording face.

That is, it is possible to form an image on the recording face, similarly to on the image-recording layer, by using a material that changes its reflectivity as well as color when a laser beam is irradiated, as the material for the recording face (recording layer). When a visible image is formed on the recording face, it is not possible to use the region where the visible image is formed for its primary purpose, data recording, and thus, it is preferable to separate in advance a data-recording region and a visible image-forming region.

As described above, the insertion time of the servo system-off pulse SSP1 or the servo system-off pulse SSP2 is preferably as short as possible without impairing the various servo controls such as laser power control, tracking control or focus control, and a shortened insertion period allows the various servo controls above to be undertaken almost without adverse influence on the visible image formed.

Back in FIG. 3, the PLL circuit (signal output means) 33 multiplies the FG pulse signal at a frequency corresponding to the rotational velocity of spindle motor 11 supplied from the frequency generator 21, and outputs a clock signal for use in forming a visible image described below. The frequency generator 21 outputs an FG pulse signal at a frequency corresponding to the spindle rotating speed by using the back electromotive force obtained by the motor driver of spindle motor 11. For example, as shown in the top line of FIG. 10, when the frequency generator 21 generates eight FG pulses during one rotation of the spindle motor 11, i.e., during one rotation of the optical disk D, as shown in the bottom line of FIG. 10, the PLL circuit 33 outputs a clock signal amplified from the FG pulse (e.g., five times larger in frequency than the FG pulse signals, 40 pulses at the H level during one rotation of the optical disk D), that is it outputs a clock signal at a frequency corresponding to the rotational velocity of the optical disk D driven by the spindle motor 11. Thus, a clock signal amplified from the FG pulse signal is outputted from the PLL circuit 33 to the FIFO memory 34, and data indicating the gradation at one set of coordinates is outputted from the FIFO memory 34 to the drive pulse-generating unit 35 at every cycle of the clock signal, that is for every rotation of the disk D of a certain angle. The clock signal amplified from the FG pulse may be generated in the PLL circuit 33 as described above, but, when a motor with sufficiently stabile rotation and drive performance is used as the spindle motor 11, the clock signal amplified from the FG pulse, i.e., the clock signal at a frequency corresponding to the rotational velocity of the optical disk D, may be generated in a crystal oscillator, which is installed replacing the PLL circuit 33.

The stepping motor 30 is a motor that moves the optical pickup 10 above the optical disk D in the radial direction of the optical disk D. The motor driver 31 drives the stepping motor 30 to rotate an amount corresponding to the pulse signal supplied from the motor controller 32. The motor controller 32 generates a pulse signal of a traveling distance and traveling direction, according to the travel-initiation instruction, including the traveling direction and traveling distance in the radial direction of the optical pickup 10, instructed from the control unit 16, and outputs the pulse signal to the motor driver 31. The laser-beam irradiation position of the optical pickup 10 can thus be moved freely to various positions of the optical disk D, by the optical pickup 10 being moved by the stepping motor 30 in the radial direction of the optical disk D and the optical disk D being rotated by the spindle motor 11, and thus, these components constitute the irradiation-position adjusting means.

The control unit 16 consists of a CPU (Central Processing Unit), a ROM (Read Only Memory) and a RAM (Random Access Memory), and others, and controls respective units in the optical-disk recording apparatus 100 and integrally controls recording on the recording face of optical disk D and image forming on the image-recording layer of optical disk D according to the program stored in the ROM.

Operation of Optical Disk Recording Apparatus

Hereinafter, the operation of the optical-disk recording apparatus 100 in the configuration above will be described. As described above, the optical-disk recording apparatus 100 is configured to record information such as audio data supplied from the host PC 110 on the recording face of an optical disk D and form a visible image corresponding to the image data supplied from the host PC 110 on the image-recording layer of the optical disk D.

The optical pick-up 10 emits a laser light with a wavelength in a range of 630 to 680 nm at a first intensity that does not substantially change the image-recording layer, and the laser light is irradiated to the pre-pits of the optical disk D. Focus and tracking servo are carried out in the same method as when reading normal DVD pits, and a signal is detected from changes in the return light.

Figure 11:
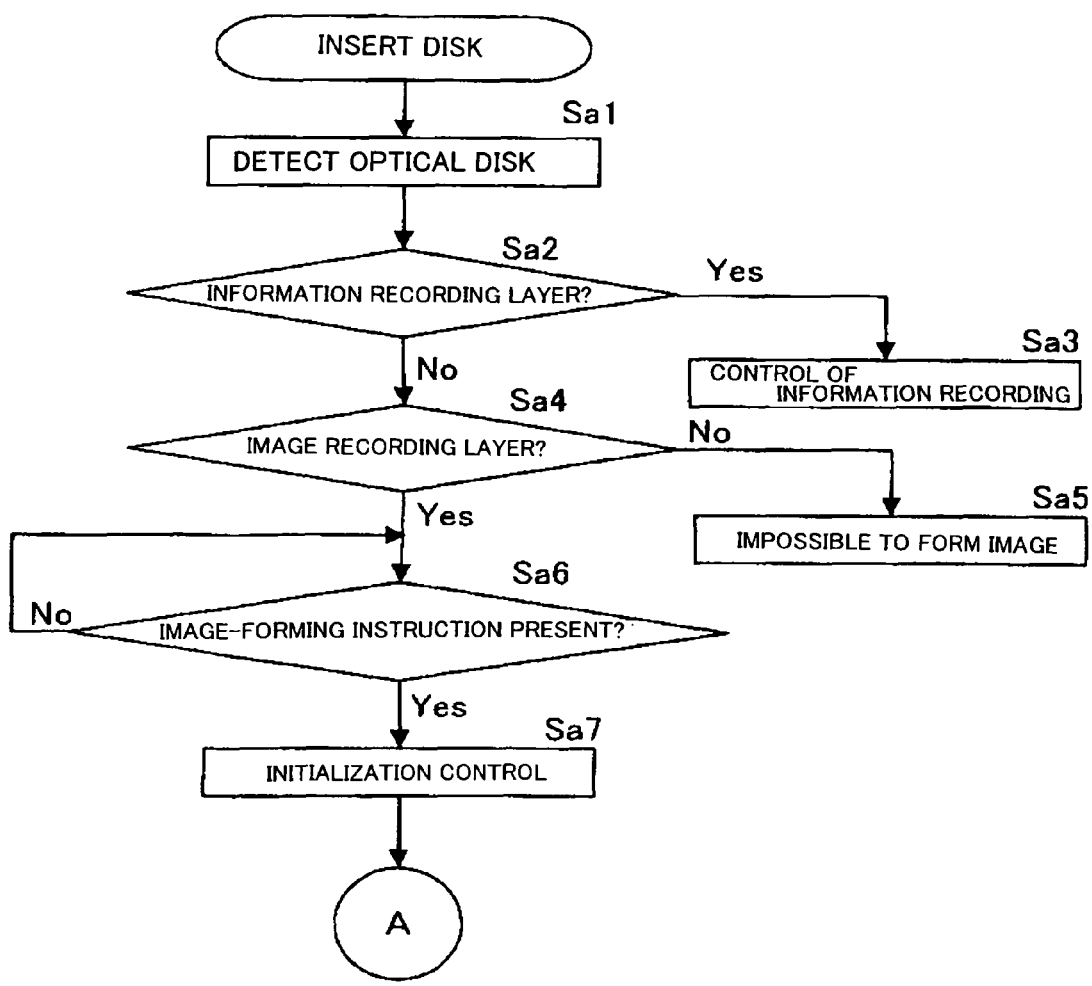
FIG. 11 shows a flow chart for describing the operation of the optical disk recording apparatus.
Figure 12:
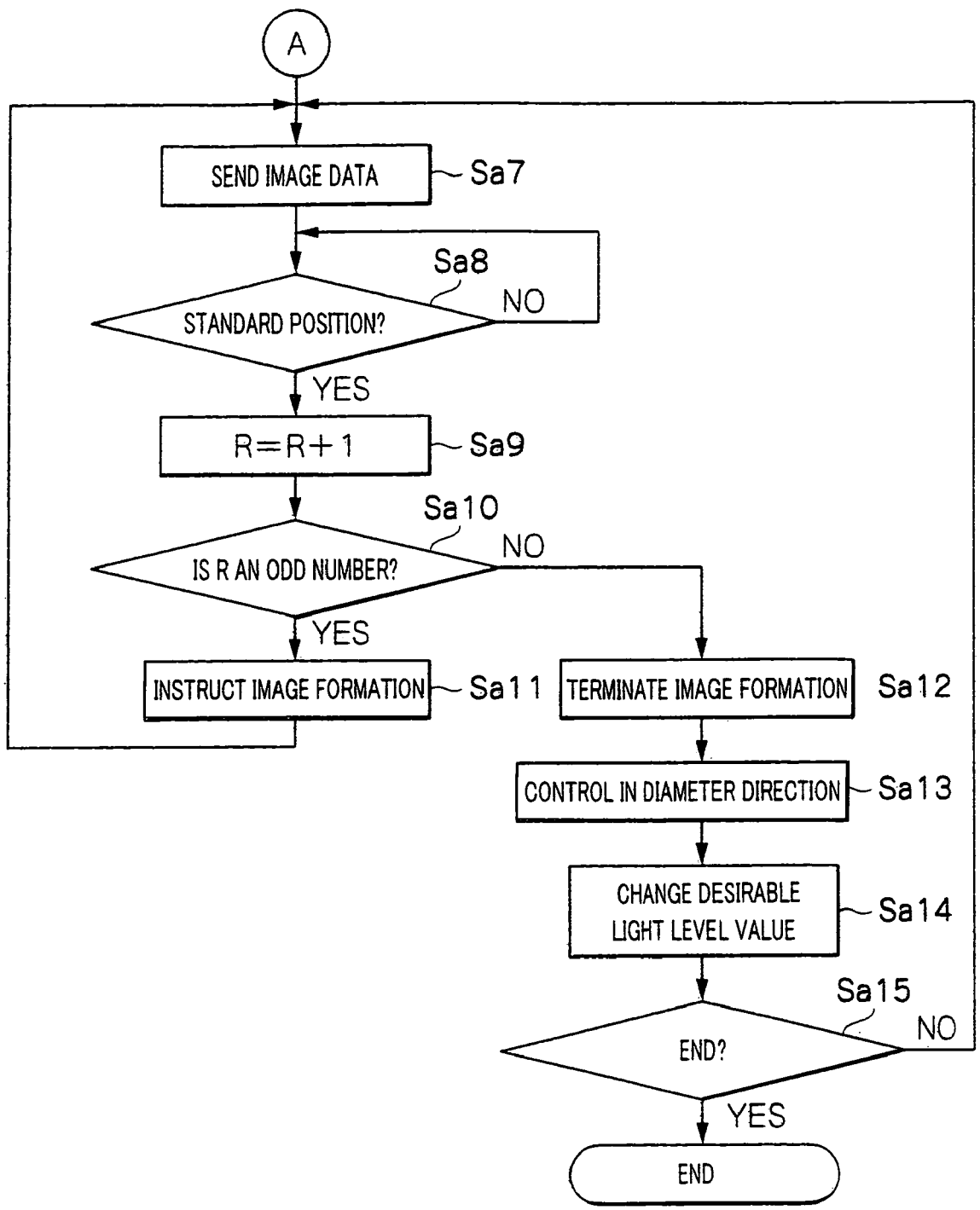
FIG. 12 shows a flow chart for describing the operation of the optical disk recording apparatus.

Hereinafter, the operation of the optical-disk recording apparatus 100 allowing processing such as information recording or visible image forming will be described with reference to FIGS. 11 and 12.

When an optical disk D is placed in the optical-disk recording apparatus 100, the control unit 16 examines the format of the face of the placed optical disk D facing the optical pickup 10, by controlling the optical pickup 10 and the like. (step Sa1). For example, it detects presence or absence of a land pre-pit signal or prerecord signal in the case of DVD-R, and an ADIP (Address in Pregroove) in the case of DVD+R. If such information is not recorded, the disk is not recognized as an optical disk.

When there is a land pre-pit signal or a prerecord signal in the case of DVD-R, or an ADIP in the case of DVD+R, detected from the placed optical disk D, the control unit 16 judges that the optical disk D is placed with its recording face facing the optical pickup 10 and performs control for recording the recording data supplied from the host PC 110 on the recording face (steps Sa2 and Sa3). The control for recording the recording data is the same as that for recording data on conventional optical-disk recording apparatuses (DVD-R and DVD+R drive apparatuses), and the description thereof is omitted.

Figure 13:
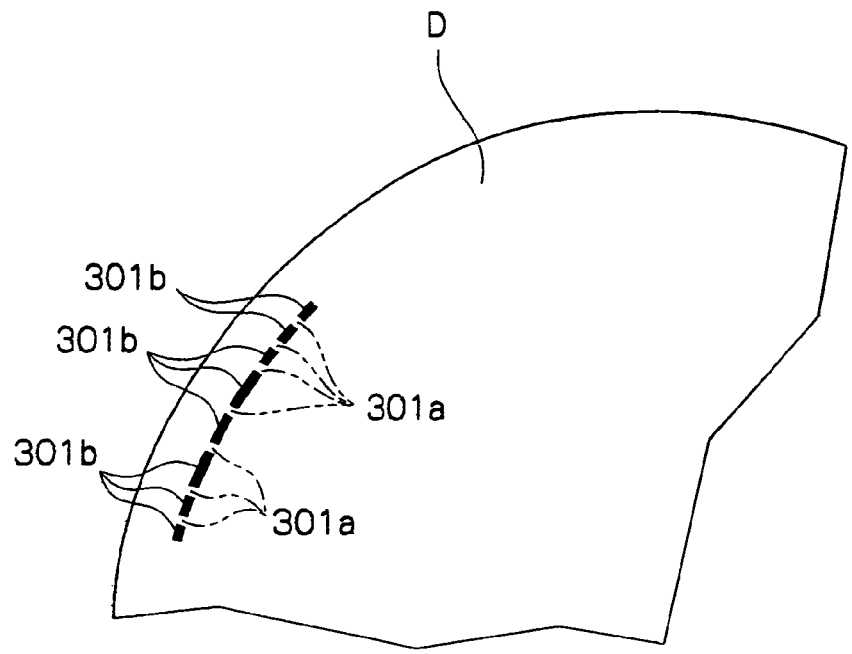
FIG. 13 shows a disk ID recorded on the image-recording layer of the optical disk.

On the other hand, when there is no pre-pit signal indicating that the optical disk is writable detected from the placed optical disk D, the control unit 16 judges that the optical disk D is placed with its image-recording layer facing the optical pickup 10, and examines whether it is possible to obtain a disk ID from the optical disk D (step Sa4). The disk ID of the optical disk D may be stored in a pre-pit signal. Also, for example as shown in FIG. 13, a visible image corresponding to the coded disk ID information can be written in advance on the outermost circle on the image-recording layer of optical disk D. As shown in FIG. 13, the disk ID is written on the outermost circle or the circumference at the innermost circle (including the middle of the logo region and the image drawing region) in the image-recording layer of optical disk D, by forming reflecting regions 301*a* and non-reflecting regions 301*b*, each at a length corresponding to the code above. The controller 16 acquires the disk ID from the reflection light by tracing the irradiation position of the laser light from the optical pick-up along the circumference at the outermost periphery of the optical disk D.

Thus, if there is no reflecting regions 301*a* and non-reflecting regions 301*b* corresponding to the disk ID formed on the outermost surface region of the image-recording layer, the optical disk D judges that the disk placed is a general purpose optical disk (CDR, DVD-R, or the like) having no image-recording layer. When there is no disk ID obtained, the control unit 16 judges that the disk D is an optical disk prohibiting visible image formation (step Sa5), and notifies the fact to the user.

Alternatively if there is a disk ID obtained from the optical disk D, the control unit 16 waits until an image-forming instruction, containing image data, is sent from the host PG 110 (step Sa6); and, when there is an image-forming instruction, the control unit 16 performs control for preparation of forming a visible image on the image-recording layer of optical disk D (step Sa7). More specifically, the control unit 16 controls the servo circuit 13 to rotate the spindle motor 11 at a particular angular velocity, and drives the stepping motor 30 by sending an instruction for moving the optical pickup 10 to the initial position, i.e., at the innermost position in the radial direction of the optical disk D, to the motor controller 32.

In the initialization control for image formation, the control unit 16 may instruct, to the servo circuit 13, a desired focus-control value to make a laser beam having a beam spot diameter larger than that when information is recorded on the recording face irradiated on the image-recording layer of optical disk D.

Figure 14:
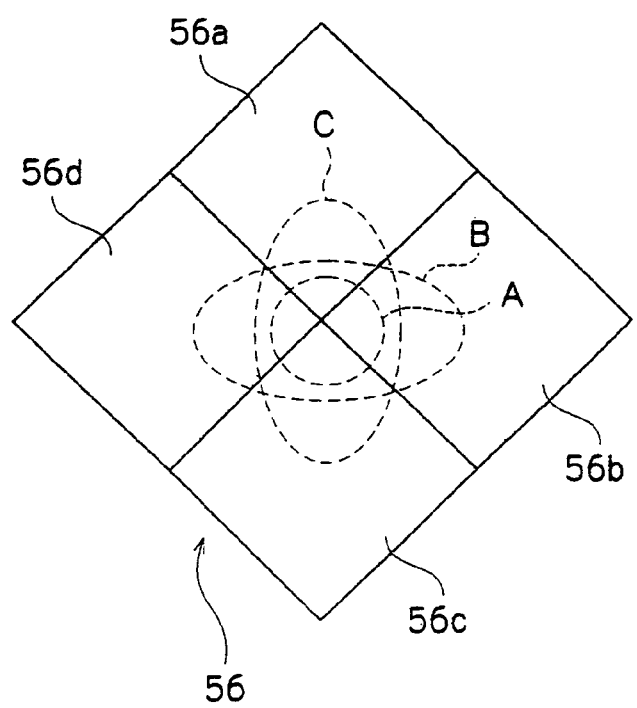
FIG. 14 shows the shape of the return light of the laser light received with a light receiving element of the optical pick-up of the optical disk recording apparatus.

The focus control performed, as described above, when such a desired value is instructed is now described more specifically. The focus control by the servo circuit 13 is performed, based on the signal outputted from the light-receiving device 56 in optical pickup 10. When information is recorded on the recording face of optical disk D, the servo circuit 13 (see FIG. 4) drives the focus actuator 64, to make a circular return light-focus (indicated by A shown in FIG. 14) at the center of four areas 56a, 56b, 56c, and 56d on the light-receiving device 56. Specifically, it controls the focus actuator 64 to make the value (a+c)−(b+d)=0, wherein the light-receiving intensities in the areas 56a, 56b, 56c, and 56d are designated respectively as a, b, c, and d.

On the other hand, when a visible image is formed on the image-recording layer of optical disk D, the focus control is performed to make a laser beam having a diameter larger than that when information is recorded on the recording face irradiated on the image-recording layer, as described above. When the shape of the return light received by the light-receiving device 56 shown in FIG. 20 is elliptic (indicated by B and C in FIG. 20), the spot size of the laser beam is greater than that in the circle form A, and thus, the servo circuit 13 drives the focus actuator 64 to make such an elliptic return light received by the light-receiving device 56. Specifically, it drives the focus actuator 64 to make the light-receiving intensities satisfy the equation (a+c)−(b+d)=$\alpha$ ($\alpha$ is not 0). Thus, in the present embodiment, the control unit 16 and the servo circuit 13 constitute the beam-spot controlling means.

Figure 15A:
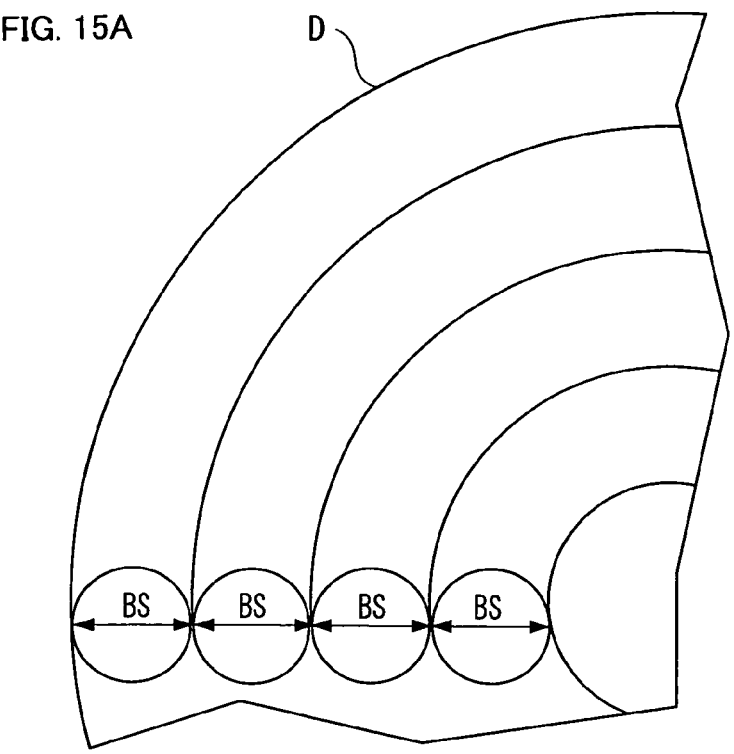
FIGS. 15A and 15B are provided for illustrating a beam spot diameter of the laser light when the pick-up of the optical disk recording apparatus irradiates the laser light to the image-recording layer of the optical disk.
Figure 15B:
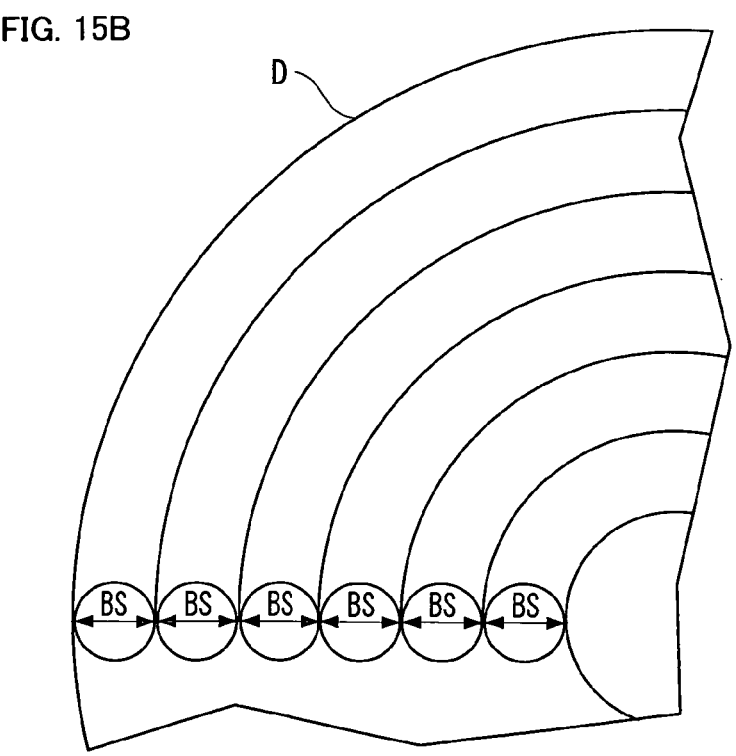

As described above, in the initialization control for forming a visible image described above, if the control unit 16 instruct $\alpha$ (not 0) to the servo circuit 13, it is possible to make a laser beam having a spot size larger than that when information is recorded on the recording face irradiated on the image-recording layer of optical disk D. By irradiating a laser beam having a spot size larger than that when information is recorded on the recording face in this manner when a visible image is formed on the image-recording layer of optical disk D, it is possible to obtain the following advantageous effects. Namely in the present embodiment, when a visible image is formed, a laser beam is irradiated as the optical disk D is rotated, similar to when information is recorded on the recording face. Thus, by expanding the beam spot size of the laser beam, it is possible to form a visible image on the entire region of the image-recording layer of optical disk D in a shorter period of time. The reason will be described hereinafter with reference to FIGS. 15A and 15B. As shown schematically in FIGS. 21A and 21B, the area of image-forming region in one rotation of the optical disk D is larger when the beam spot diameter BS of the laser beam irradiated is larger (FIG. 15A) than when it is smaller (FIG. 15B). Accordingly, when the beam spot diameter BS is smaller, it is necessary to rotate the optical disk D more times and thus, demands a longer period to form an image on the entire region (4 rotations with the beam with greater BS, vs. 6 rotations with the beam with smaller BS in the Figure). For the reason above, a laser beam having a spot diameter larger than that when information is recorded on the recording face is irradiated in the optical-disk recording apparatus 100 when a visible image is formed.

The image is drawn in the invention based on information carried in the pre-pit signal or, in other words, the image is drawn based on pre-pit information, such as image drawing conditions, recorded in advance. For example, the image drawing conditions corresponding to pre-pit information can be arranged in a table in advance and stored in ROM of the controller. The controller reads out the image drawing conditions corresponding to detected pre-pit information with reference to the table, and the image can be drawn according to optimum drawing conditions by drawing the image based on the read out conditions.

In the initialization control for image forming, the control unit 16 instructs desired values of the light and servo levels to the laser power-controlling circuit 20 to make laser beams irradiated from the optical pickup 10 at the light level and the servo level suitable for capturing disk ID. The ROM in control unit 16 stores the desired values of the light and servo levels for multiple kinds of disk ID's, and the control unit 16 reads out the desired values of the light and servo-levels corresponding to the captured disk ID and instructs these desired values to the laser power-controlling circuit 20.

The desired power values are allocated according to the disk ID, because of the following reasons. The properties of the colorant in the image-recording layer may vary according to the kind of the optical disk D used, and if the properties are different, then naturally the relationship between the intensity of the laser beam irradiated and the reflectivity also changes. As a result, even if it is possible to change the reflectivity of the irradiation region sufficiently by irradiating an image-recording layer of a particular optical disk D with a laser beam at a particular light level, it is not necessarily possible to change the reflectivity of the irradiated region when a laser beam at the same light level is irradiated on the image-recording layer of another optical disk D. Thus in the present embodiment, as described above desired values of the light and servo levels favorable for accurate image forming are determined in advance by experiment for optical disks corresponding to each disk ID. By storing the determined desired values corresponding to each disk ID in the ROM, it is possible to control the power optimally according to the properties of the image-recording layer of optical disk D.

When the initialization control described above is performed by the control unit 16, forming of a visible image on the image-recording layer of optical disk D can be carried out. As shown in FIG. 12, the control unit 16 first transfers the image data supplied from the host PC 110 via the buffer memory 36 to the FIFO memory 34 (step Sa7). The control unit 16 then judges whether a predetermined reference position of the optical disk D rotated by the spindle motor 11 has passed the laser-beam irradiation position of the optical pickup 10 from the FG pulse signal supplied from the frequency generator 21 (step Sa8).

Figure 16:
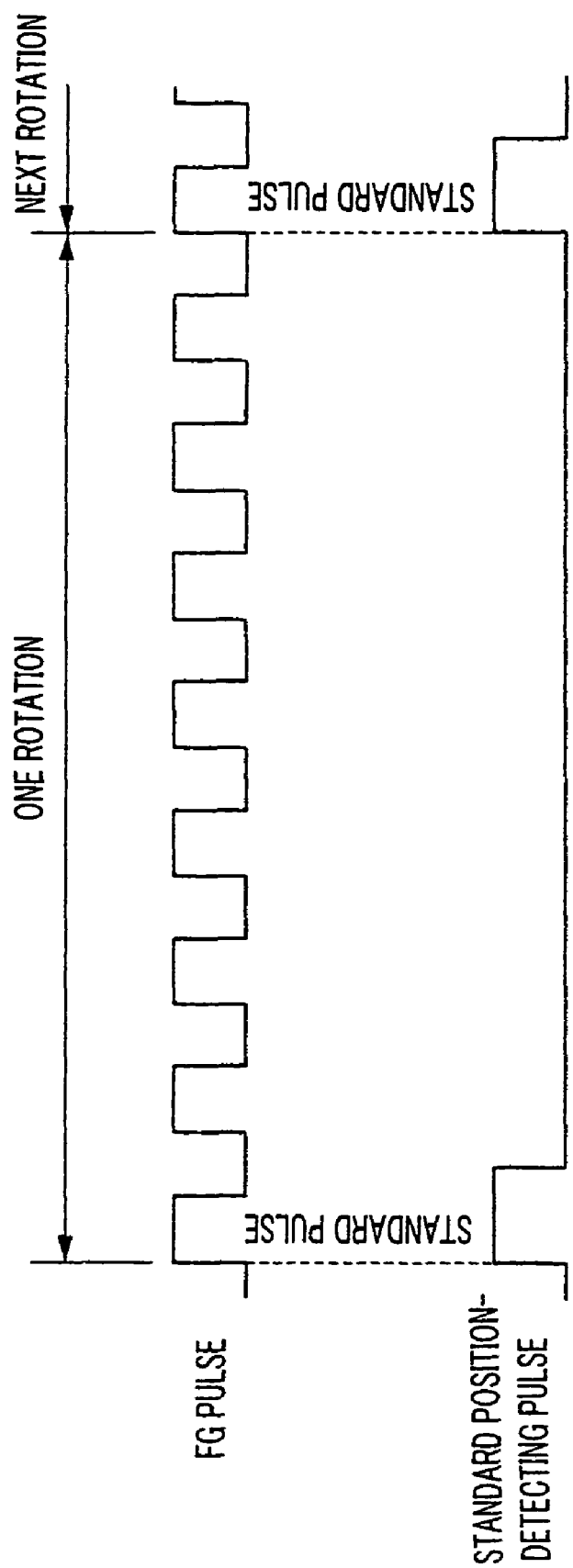
FIG. 16 is provided for illustrating a method for detecting that a laser irradiation position of the optical disk recording apparatus has passed through a reference position of the optical disk.
Figure 17:
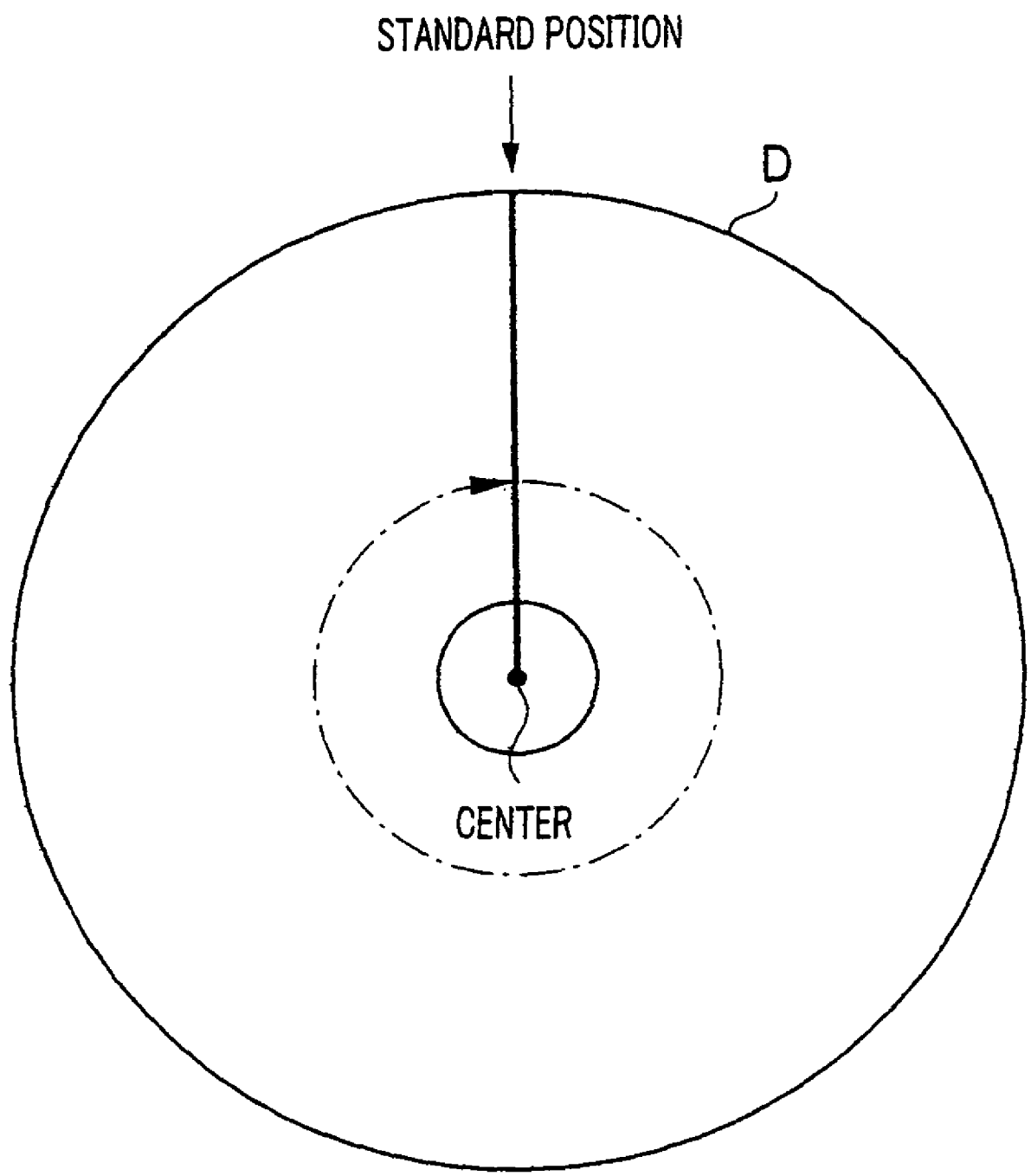
FIG. 17 is provided for illustrating a method for detecting that a laser irradiation position of the optical disk recording apparatus has passed through a reference position of the optical disk.

The method of detecting the particular reference position and whether it passed the laser-beam irradiation position will be described hereinafter, with reference to FIGS. 16 and 17. As shown in FIG. 15, the frequency generator 21 outputs a certain number of FG pulses (8 in the example of FIG. 16) during one rotation of the spindle motor 11, i.e., one rotation of the optical disk D. Thus, the control unit 16 outputs a reference position-detecting pulse, synchronized with the start-up timing of any one of the FG pulses supplied from the frequency generator 21, as a reference pulse, and then, generates a reference position-detecting pulse signal for outputting the reference position-detecting pulse, synchronized with the start-up timing of the pulse that is the number of pulses of one rotation after the reference position-detecting pulse (the eighth pulse in FIG. 16). By generating such reference position-detecting pulses, it is possible to judge that the laser-beam irradiation position of optical pickup 10 passes through the reference position of optical disk D when the pulse is generated. Thus as shown in FIG. 17, if the laser-beam irradiation position of optical pickup 10 at the timing of the first reference position-detecting pulse generated is as shown by the thick line in FIG. 17 (the irradiation position is shown as a line because the optical pickup 10 is movable in the radial direction), then when the reference position-detecting pulse is generated after one rotation, the laser-beam irradiation position of optical pickup 10 is, of course, on the thick line in FIG. 17. The line in the radial direction of the laser-beam irradiation position at the timing when the first reference position-detecting pulse is generated represents the reference position; and as described above, the control unit 16 detects that the laser-beam irradiation position passes the reference position of optical disk D, based on the reference position-detecting pulse signal generated in every rotation of the optical disk D. The dotted line in FIG. 17 shows an example of the traveling locus of the laser-beam irradiation position during a period from when one reference position-detecting pulse is generated to when the next reference position-detecting pulse is generated.

When the control unit 16 detects, according to the method above, that the reference position of optical disk D passes the laser-beam irradiation position after receiving an image-forming instruction from the host PC 110, it increments the parameter R by 1, indicating the number of rotatations (step Sa9), and then, judges whether R is an odd number (step Sa10).

When the position of optical disk D passes the laser-beam irradiation position for the first time after reception of the image-forming instruction, the value R is 0 (initial value)+1=1, and in such a case, R is judged to be an odd number in step Sa10. When R is found to be an odd number, the control unit 36 controls the optical pickup 10 to form a visible image on the image-recording layer of optical disk D by irradiation of the laser beam (step Sa11). More specifically, from the time of receipt of the reference position-detecting pulse, the control unit 16 controls respective units to output image data from the FIFO memory 34 one by one in synchrony with the clock signal outputted from the PLL circuit 33.

Figure 18:
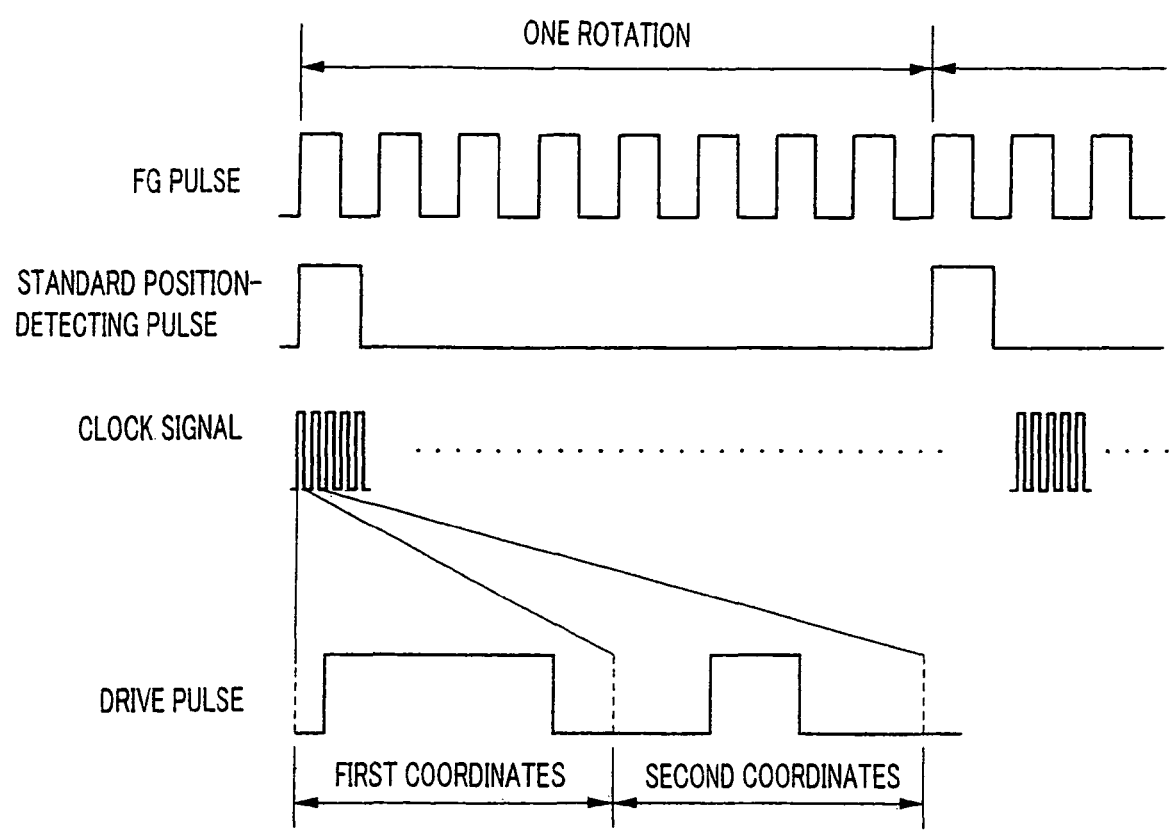
FIG. 18 is a timing chart for describing the operation of the optical disk recording apparatus when a visible image is formed by irradiating laser light to the image-recording layer of the optical disk.
Figure 19:
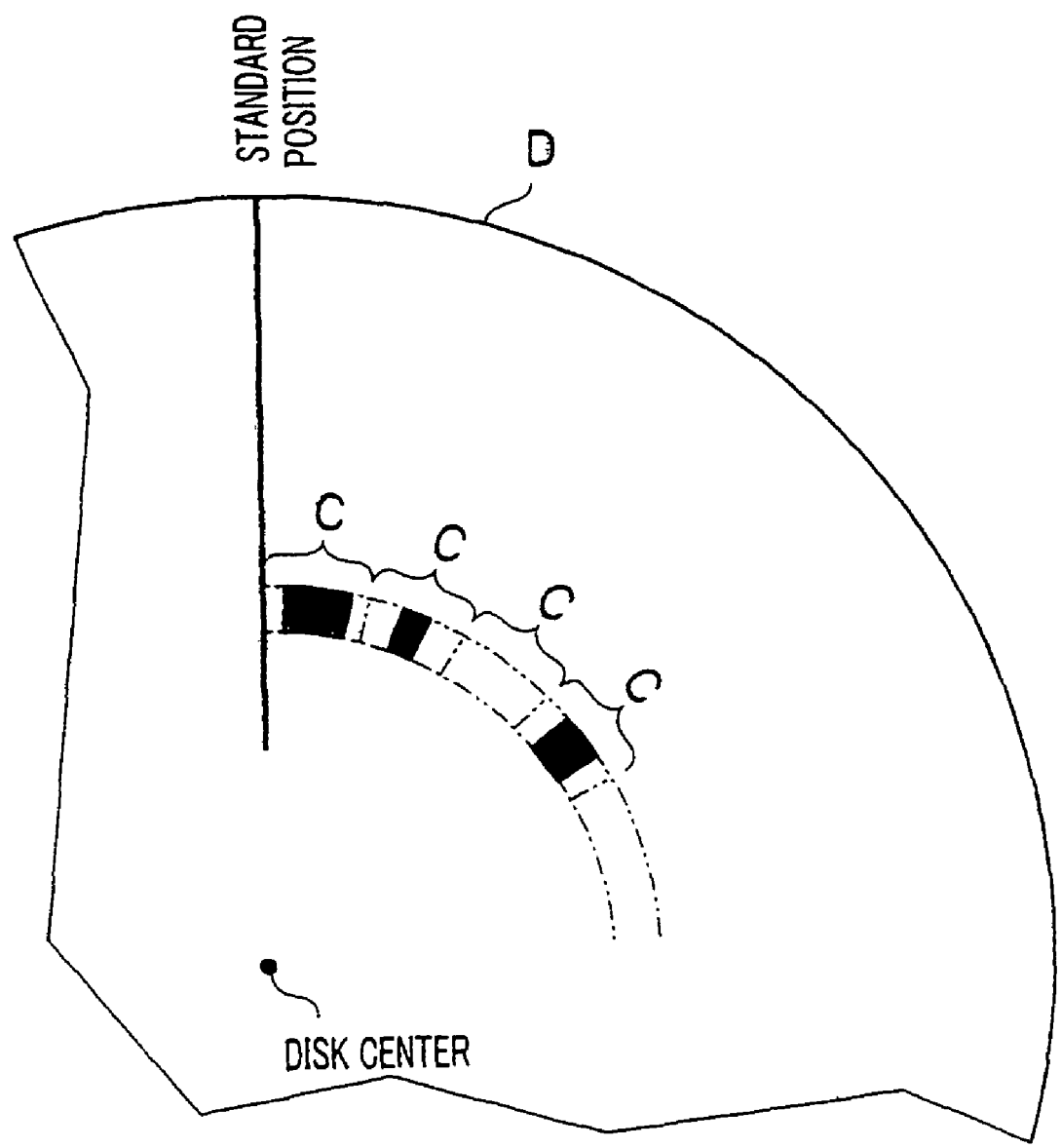
FIG. 19 shows the image-recording layer of the optical disk after being irradiated with a laser light with the optical disk recording apparatus.

As shown in FIG. 18, by the control, the FIFO memory 34 outputs information indicating the density of one set of coordinates to the drive pulse-generating unit 35 whenever the clock pulse is supplied from the PLL circuit 33, and the drive pulse-generating unit 35 generates a drive pulse having a pulse width according to the density shown in the information and outputs it to the laser driver 19. As a result, the optical pickup 10 irradiates laser beam on the image-recording layer of optical disk D at the light level for a period corresponding to the density of each set of coordinates, and forms a visible image similar to that shown in FIG. 19 by the change in reflectivity in the irradiation region.

As shown schematically in the Figure, because the optical disk D is rotated by the spindle motor 11, the laser-beam irradiation position of the optical pickup 10 travels along the circle for the region C shown in the Figure per cycle of clock signal (period from a start-up timing to the next start-up timing of the pulse). By changing the period of the laser beam irradiated at the light level according to the density during the laser-beam irradiation position passes through the region C as described above, it is possible to change the reflectivity of different area in each region C according to the different density, as shown in the Figure. Thus by changing the period of the laser beam irradiated at the light level according to the density of each set of coordinates during the laser beam irradiation position passes through the region C, it is possible to form a visible image corresponding to the image data on the image-recording layer of optical disk D.

As described above, after the control for forming a visible image by irradiating a laser beam according to the image data, the processing in the control unit 16 returns to step Sa7, and the image data supplied from the buffer memory 36 is transferred to the FIFO memory 34. It is then examined whether the laser-beam irradiation position of optical pickup 10 passes the reference position of optical disk D, and, if it passed the reference position, one is added to R. When R becomes an even number as a result, the control unit 16 controls respective units in the apparatus, to terminate visible image formation by the laser-beam irradiation control described above (step Sa12). More specifically, it controls the FIFO memory 34 so as not to undertake the output of the information, indicating the gradation of each set of coordinates in synchrony with the clock signal supplied from the PLL circuit 33, to the drive pulse-generating unit 35. Thus, the control unit 16 prohibits the laser-beam irradiation from causing change in the reflectivity of the image-recording layer during the period after one rotation of the disk D during which a visible image is formed by irradiation of a laser beam at the light level on the image-recording layer of optical disk D.

When the laser-beam irradiation for forming a visible image is terminated, the control unit 16 instructs the motor controller 32 to relocate the optical pickup 10 outward in the radial direction by a certain distance (step Sa13); the motor controller 32 drives the stepping motor 30 via the motor driver 31 according to the instruction; and the optical pickup 10 is relocated outward by the certain distance.

The certain distance of the optical pickup 10 being relocated in the radial direction of the optical disk D may be determined properly according to the beam spot diameter BS of the laser beam irradiated from the optical pickup 10 (see FIG. 15), as described above. When a visible image is formed on the image-recording layer of disk-shaped optical disk D, it is necessary to make the laser-beam irradiation position of optical pickup 10 travel over almost the entire face of the optical disk D, without leaving gaps, in order to obtain a higher-quality image. Thus by making the unit traveling distance of the optical pickup 10 in the radial direction substantially identical to the beam spot size BS of the laser bean irradiated on the optical disk D, it is possible to irradiate the laser beam almost entirely all over the face of the optical disk D and obtain a higher-quality image. Occasionally, color develops in a region greater than that of the beam spot diameter of the laser beam irradiated, depending on various factors including the properties of the image-recording layer, and in such a case, the unit traveling distance is decided while considering the width of the coloring region, so that neighboring coloring regions do not superimpose.

In the present embodiment, the beam spot diameter BS is set to a value larger than that for recording on the recording face (for example, approximately 20 μm), and thus, the control unit 16 controls the motor controller 32 and drives the stepping motor 30 to make the optical pickup 10 travel in the radial direction to a distance almost identical to that of the beam spot diameter BS. Many recent stepping motors 30 allow control of the traveling distance at units of 10-μm by using microstepping technology, and thus, it is sufficiently practical to make the optical pickup 10 travel in the radial direction at the 20-μm unit by using a stepping motor 30, as described above.

After control for relocation of the optical pickup 10 in the radial direction by a certain distance, as described above, the control unit 16 then instructs the desirable light level value at which the laser beam at the light level is to be irradiated after change to the laser power-controlling circuit 20, to alter the desirable light level of the laser beam therein (step Sa14). In the present embodiment, the visible image is formed in the CAV mode of irradiating laser beam, while the optical disk D is rotated at a constant angular velocity, and, as described above, relocation of the optical pickup 10 toward external surface results in an increase in the linear velocity. Thus, when the optical pickup 10 is relocated outward in the radial direction (to the external surface), as described above, the desirable value at the light level of the laser beam is increased from that before; and a laser power at an intensity sufficient for changing the reflectivity of the image-recording layer of optical disk D is irradiated, even though the linear velocity varies.

After control for moving the optical pickup 10 outward in the radial direction and the change of the desirable value at the light level, as described above, the control unit 16 judges whether there is not-yet-processed image data, i.e., image data not supplied to the drive pulse-generating unit 35, for visible image forming, and if there is no such image data, the processing thereby is terminated.

On the other hand, if there is not-yet-processed image data not yet supplied to the motor controller 32, the processing goes back to step Sa7, and the processing for forming a visible image is continued. The image data is transferred from the control unit 16 to the FIFO memory 34 (step Sa7); and it is judged whether the laser-beam irradiation position passes the reference position of optical disk D (step Sa8). If it passes the reference position, one is added to the variable R indicating the number of rotations (step Sa9); and it is judged whether the R after addition is an odd number (step Sa10). If R is an odd number, the control unit 16 controls respective units of the apparatus to from a visible image by irradiating a laser beam; and if R is an even number, it terminates the laser-beam irradiation for forming a visible image (still irradiating a laser beam at the servo level), and perform control for moving the optical pickup 10 outward in the radial direction and for changing the desirable value at the light level. When laser-beam irradiation for image formation (including at the light level) is performed on the optical disk D in one particular revolution, the control unit 16 controls so as not to perform laser-beam irradiation for image formation in the next revolution, but to make the optical pickup 10 move outward in the radial direction in that revolution. Thus by controlling so as not to perform laser-beam irradiation for image formation in the next revolution so as to make the optical pickup 10 move outward in the radial direction in that revolution, it is possible to perform laser-beam irradiation for image formation without image formation during changing the irradiation radial position and changing the intensity of the irradiated laser beam associated with the control, and image formation can be carried out when the irradiation position and the intensity of laser beam are stabilized. It is thus possible to prevent deterioration in the quality of the visible image due, for example, to control for moving the optical pickup 10 outward in the radial direction.

So far described is the primary operation of the optical-disk recording apparatus 100, and it is possible to form a visible image corresponding to the image data by irradiating the image-recording layer of an optical disk D with a laser beam in the optical-disk recording apparatus 100, by making the best use of the optical pickup 10 and the like, for use in recording information on the recording face, without using an additional printing means or the like.

Because the laser-beam irradiating timing is controlled, based on the clock signal generated by using the FG pulse generated according to the rotation of the spindle motor 11, i.e., the clock signal generated according to the amount of rotation of the optical disk D in the present embodiment, it is possible to determine the laser-beam irradiation position in the optical-disk recording apparatus 100, without obtaining, for example, positional information from the optical disk D side. As a result, the optical-disk recording apparatus 100 is free from restrictions demanding a specially-finished optical disk D such as having pregrooves (guide grooves) for the image-recording layer, and it is possible to form a visible image corresponding to the image data even on an image-recording layer having no pregroove or position information formed in advance.

Recording of information (digital information) on the information recording layer will be described next. When the information recording layer is a dye-containing layer, a laser beam is first irradiated from a laser pickup onto an unrecorded optical recording medium which is rotating at a certain recording linear velocity. As the dye in the recording layer absorbs the irradiated light, resulting in local heating of the layer, which in turn generates desirable voids (pits) therein, causing changes in the optical properties, resulting in the recording of information.

For the generation of one pit, the laser beam may have a recording waveform of a pulse train or a single pulse. The ratio of the length of the information to be actually recorded (pit length) is important.

The pulse width of the laser beam is preferably in the range of 20 to 95%, more preferably in the range of 30 to 90%, and still more preferably in the range of 35 to 85% with respect to the length of the information to be actually recorded. When the recording waveform is a pulse train, then the width of the combination wave of the pulse train is in the ranges above.

The output of the laser beam may vary according to the recording linear velocity, and is preferably in the range of 1 to 100 mW, more preferably in the range of 3 to 50 mW, and still more preferably in the range of 5 to 20 mW when the recording linear velocity is 3.5 ml/s. Alternatively, when the recording linear velocity is increased to double the above, the preferable ranges of the laser beam output becomes $2^{1/2}$ times greater.

The NA of the objective lenses that are used in the pickup, in view of improving recording density, is preferably 0.55 or more, and more preferably 0.60 or more.

In the invention, a semiconductor laser having an emission wavelength in the range of 350 to 850 nm may be used as the recording light.

Hereinafter, recording devices for the optical recording media wherein the information recording layer is a phase transition layer will be described. When the information recording layer is a phase transition layer, the information recording layer is composed of the materials described above, and is able to repeat phase transitions between the crystalline phase and the amorphous phase by laser beam irradiation.

During information recording, the phase-transition recording layer is locally melted by irradiation of a focused laser beam pulse for a short time period. The melted area is solidified by rapid cooling under heat diffusion, forming a recorded mark in the amorphous state. When the recorded information is being erased, the recorded mark in the amorphous state is recrystallized into the original unrecorded state by heating the information recording layer to a temperature of less than the melting point but more than the crystallization temperature by irradiating with a laser beam and then cooling gradually

CROSS-REFERENCE TO RELATED APPLICATION

This application claims benefits of and priority to Japanese Patent Application No. 2005-287883, filed on Sep. 30, 2005, which is incorporated herein by reference in its entirety for all purposes.

The invention claimed is:
1. An optical disk system comprising:
an optical disk comprising, on a substrate having pre-pits, an image-recording layer capable of having an image drawn thereon by irradiating laser light; and a reading device that irradiates laser light having a wavelength in a range of from 630 to 680 nm to the pre-pits of the optical disk and that reads information included in the pre-pits from return light of the laser light, wherein the pre-pits have a shortest pit length in a range from 0.6 to 0.9 µm;

information included in the pre-pits is recorded by EFM modulation; and a modulation factor of the pre-pits is 0.5 or more.

2. The optical disk system of claim 1, wherein a track pitch of the pre-pits is in a range of 1.5 to 1.7 µm.

3. The optical disk system of claim 1, wherein the laser light irradiated to the pre-pits is converged with a lens having a numerical aperture in a range of 0.6 to 0.7.

4. The optical disk system of claim 1, wherein a modulation factor of the pre-pits is 0.6 or more.

5. An optical disk system comprising:

an optical disk comprising, on a substrate having pre-pits, an image-recording layer capable of having an image drawn thereon by irradiating laser light; and a reading device that irradiates laser light having a wavelength in a range of from 630 to 680 nm to the pre-pits of the optical disk and that reads information included in the pre-pits from return light of the laser light, wherein the pre-pits have a shortest pit length in a range from 0.6 to 0.9 µm;

information included in the pre-pits is recorded by EFM modulation;

a modulation factor of the pre-pits is 0.5 or more; and 3T jitter and 11T jitter of the pre-pits are respectively 50 ns or less.

6. The optical disk system of claim 5, wherein the 3T jitter and 11T jitter of the pre-pits are respectively 45 ns or less.

* * * * *